(12) United States Patent
Owens et al.

(10) Patent No.: US 6,338,140 B1
(45) Date of Patent: Jan. 8, 2002

(54) METHOD AND SYSTEM FOR VALIDATING SUBSCRIBER IDENTITIES IN A COMMUNICATIONS NETWORK

(75) Inventors: Leslie D. Owens, Vienna; Mark S. Plecity, Oakton; Alvah B. Davis, McLean; David T. Kiswani; I-Hsiang Yu, both of Falls Church, all of VA (US)

(73) Assignee: Iridium LLC, Arlington, VA (US)

( * ) Notice: Subject to any disclaimer, the term of this patent is extended or adjusted under 35 U.S.C. 154(b) by 0 days.

(21) Appl. No.: 09/198,440

(22) Filed: Nov. 24, 1998

Related U.S. Application Data

(60) Provisional application No. 60/094,160, filed on Jul. 27, 1998.

(51) Int. Cl.$^7$ ................................................. H04L 9/00
(52) U.S. Cl. ..................... 713/168; 713/171; 713/182; 713/200; 380/255; 380/277; 380/281
(58) Field of Search ............................... 713/168, 171, 713/182, 200, 201; 380/255, 277, 281, 285, 28

(56) References Cited

U.S. PATENT DOCUMENTS

| | | | |
|---|---|---|---|
| 5,594,798 A | * | 1/1997 | Cox et al. ..................... 380/49 |
| 5,668,878 A | * | 9/1997 | Brands ........................ 380/30 |
| 5,696,827 A | * | 12/1997 | Brands ........................ 380/30 |
| 5,729,609 A | * | 3/1998 | Moulart et al. ................ 380/21 |

\* cited by examiner

*Primary Examiner*—Thomas R. Peeso
(74) *Attorney, Agent, or Firm*—Baker & Hostetler LLP

(57) ABSTRACT

A method and/or system for validating subscribers includes an insecure communications network, such as, an IS-41 wireless telephone network connecting a plurality of telephone switches. A subscriber or user of the system enters a sequence of digits, namely, a random PIN (personal identification number), and a telephone number of whom he wishes to call. The random PIN provides effectively a "digital signature" to the telephone number. A second number is dialed to effect call completion. An authentication center exists which authenticates the user by verifying the digital signature and updating a user profile to permit a call only to the telephone number in the sequence dialed by the user. The profile is sent to the serving switch which permits calls only to the destination in the profile. This technique eliminates fraudulent users from stealing telephone identities, "cloning" phones and placing calls. Calls are optionally completed only to destinations that have been validated.

31 Claims, 16 Drawing Sheets

US 6,338,140 B1

METHOD AND SYSTEM FOR VALIDATING SUBSCRIBER IDENTITIES IN A COMMUNICATIONS NETWORK

RELATED APPLICATIONS

This application claims priority to U.S. Provisional Application Ser. No. 60/094,160, filed Jul. 27, 1998, and incorporated herein by reference.

FIELD OF THE INVENTION

The invention relates, in general, to a method and system for validation and/or authentication of an identity, and, in particular, to a method and apparatus/system for authenticating subscribers in a communications network, such as a wireless, digital, cellular, and/or satellite communications system, using a central host processor. The central processor includes all the interfaces and functions to connect to the communications system, to decode signals and messages, to verify and to validate subscribers in the communications system, and to signal to entities in the system that subscribers are legitimate. This system provides a significant level of protection against fraud and abuse, particularly wireless fraud and abuse.

BACKGROUND OF THE INVENTION

Cellular mobile telephony is one of the fastest growing segments in the worldwide telecommunications market. Between 1984 and 1992, for example, the number of mobile telephone subscribers in the United States grew from around 25,000 to over 10 million. In 1998, the number is estimated to be 58 million and is expected to rise to nearly 90 million by the year 2000.

In a typical cellular radio system, as shown in FIG. 1, a geographical area is divided into several radio coverage areas, called cells C1–C14. These cells are served by a series of radio stations, called base stations B1–B14. The base stations are connected to and controlled by a mobile switching center (MSC) MSC1, MSC2. The MSC is in turn connected to the land line (wireline) public switched telephone network (PSTN). The users in the cellular radio system, known as mobile subscribers, are provided with portable (hand-held), transportable or mobile (car-mounted) telephone units, which are collectively called mobile stations.

The mobile stations MS1–MS4, shown in FIG. 1, communicate with a mobile switching center MSC1 through respective nearby base stations B1, B5. The MSC switches calls between wireline or landline and mobile subscribers, controls signaling to the mobile stations, compiles billing information, and provides for the operations, maintenance, and testing of the system. The MSCs are also connected together through a signaling network to allow "roaming" across large geographic areas.

In the United States, the Advanced Mobile Phone Service (AMPS) began in 1984. A serious problem which has plagued cellular communications systems is fraud. There have been numerous types of fraudulent use of cellular communications facilities, resulting in significant monetary losses for the operators of those AMPS wireless telephone systems. The fraudulent access has ranged from "roamer" fraud to tumbling to cloning. The most common type of fraud is "cloning." The Cellular Telecommunications Industry Association (CTIA) reports that losses resulting from cloning exceed $300 million per year in the United States.

Mobile stations or terminals, subject to cloning, typically are identified by a mobile identification number and an electronic serial number. Ordinarily, a mobile identification number (MIN), which is assigned to a subscriber's mobile station or terminal when it is activated, is identical to the dialed directory number or mobile telephone number. An electronic serial number (ESN) is a 32-bit binary number that consists of three parts: the manufacturer code, a reserved area, and a manufacturer-assigned serial number. The ESN, which represents a terminal, is fixed and, supposedly, cannot be changed.

Cloning entails an interloper or "fraudster" capturing the identity of a wireless telephone by using standard test equipment to capture the Electronic Serial Number (ESN) and Mobile identification Number (MIN) of the legitimate user. For example, a standard frequency scanner may be used to scan a common control channel for MIN-ESN combinations transmitted from a mobile station registering with a mobile switching center. The interloper reprograms a mobile station, such as, another mobile telephone, with the captured ESN and MIN. Impersonating the legitimate subscriber, the cloner may then place fraudulent calls, which are charged to the legitimate subscriber.

Such cloning occurs because the original AMPS network did not have the means to validate the wireless use. FIG. 1 illustrates the telephone systems without authentication. However, in 1991 the Telecommunications Industry Association (TIA) wireless/cellular standards (TR45.3) organization developed a scheme to authenticate subscribers.

Authentication was developed by the cellular industry to prevent cloning. Authentication is the process of validating a user's identify by proving the existence of shared secret data (or a cryptographic key) in the mobile station of the user and the cellular network. Both the mobile station (MS) and the network possess the software protocol, cryptographic algorithms, and key to perform authentication. The general elements for one type of authentication, which is believed to be disclosed in U.S. Pat. No. 5,153,919 to James A. Reeds, III et al., which is incorporated herein by reference, are depicted in FIG. 2. Unfortunately, this standardized technique is not ubiquitous; MSCs and MSs do not all have software to support the validation.

The authentication mechanism developed by the standards committee for Telecommunications Industry Association (TIA) is shown in FIG. 3. CAVE is the "Cellular and Voice Encryption" cryptographic algorithm. Through the use of CAVE's "challenge-response" authentication scheme, validation of subscriber identities can occur. The steps in the process shown in FIG. 4 are the following:

Step S10: The telephone, as it powers on, identifies itself to the network with the ESN and MIN.

Step S12: The network sends a random number challenge to the phone.

Step S14: The phone, using a CAVE cryptographic algorithm, encrypts or "hashs" a number of inputs including the ESN, the MIN and a SSD key to produce an authentication response AUTHR. The SSD (Shared Secret Data) key is derived from the seed A-key.

Step S16: The telephone sends AUTHR to the network. Step S18: The network performs the same CAVE cryptographic computation.

Step S20: The network compares the two responses.

Step S22: If the responses (AUTHR) are equivalent, service is granted because the network operator can be quite confident that the subscriber is legitimate.

Step S24: If the responses (AUTHR) are not equivalent, service is denied because the network operator cannot be confident that the subscriber is legitimate.

The above authentication scheme has been very effective against fraud. However, three major events must occur before it is absolutely effective against technical fraud. These three events are the following. First, all phones must contain the cryptographic algorithm and protocol. Second, all switches must be upgraded or sold with the cryptographic algorithm. Third, all phones and switches must have the seed cryptographic key (A-key). The authentication scheme in the telephone system is illustrated in FIG. 5. The authentication may occur in a Mobile Switching Center MSC or in an off-board computer, namely, an authentication center AC.

The deployment of authentication began in 1995. Today approximately 10% of all MSCs have the capability to authenticate. CTIA reports approximately 58 million subscribers exist in North America. Yet, it is estimated that only 10 million of the telephones have the CAVE cryptographic capabilities, designed to the latest standards. Those switches (MSCs) that cannot authenticate are designed to the TIA IS-41 Revision A (Rev. A) standard. The IS-41 Revision C (Rev. C) MSCs can authenticate. It may be years before all MSCs and telephones are "authentication capable" in the AMPS-based air-interface technologies: IS-54B, IS-136, IS-91, IS-95, etc. FIG. 6 summarizes the current authentication situation for mobile switching centers and telephones. Essentially, as time progresses more and more MSCs and telephones will likely have authentication features.

In Europe and other locations around the world, the standard Global System for Mobile (GSM) cellular telephoning has dominated. It is fully authentication-capable. The authentication scheme for GSM is very similar to the AMPS IS-41 cellular authentication scheme. In the GSM environment, there have been no reports of cloning or technical fraud. GSM is in the "ubiquitous" authentication state; all MSCs and all phones therein authenticate. Note in GSM, the authentication occurs on a Subscriber Identity Module (SIM) smart card inserted in the telephone.

FIG. 7 illustrates the GSM authentication scheme. The mobile station is uniquely identified by a International Mobile Subscriber Identity (IMSI). This information, along with the individual subscriber authentication key Ki, constitutes sensitive identification credentials, analogous to the Electronic Serial Number (ESN) in systems such as AMPS.

When a mobile station MS attempts to access the system, the network issues it a 128-bit random number challenge RAND. The MS computes a 32-bit signed response SRES to RAND using a one-way hash function A3 under control of the subscriber authentication key Ki. The key Ki is shared only by the subscriber and an authentication center which serves the subscriber's home network. That is, the authentication center includes all subscriber authentication keys Kis.

The value SRES computed by the MS is signaled to the network, where it is compared with a pre-computed value. If the two values of SRES agree, the mobile subscriber has been authenticated, and the call is allowed to proceed. If the values are different, then access is denied. Because GSM has effectively zero technical fraud, carriers in the UK, Europe and other locations have not suffered any losses.

With two major incompatible standards, GSM and IS-41, as well as several others, there is a desire to connect the systems to allow interoperability. This allows a subscriber to go from one system to the other and have "one telephone number." Calls are automatically translated to the new system and protocol. Connectivity of the two systems is shown in FIG. 8. Note that the A3 authentication algorithm is a generic term used for the standard COMP128 cryptographic algorithm used in GSM systems. Between the two systems is the Interoperability Unit (IU) that provides protocol translation and facilitates calls between the two systems. A subscriber in GSM has a GSM "air-interface" phone with a SIM. That subscriber in IS-41 must have a phone that works with IS-41 based air-interface protocols (i.e., IS-91. IS-136, IS-54B, IS-9S, EIA/TIA 553).

When a call is placed to a GSM phone, if the subscriber is in the IS-41 network, the call is delivered to the IS-41 phone through interworkings of the IU. The IU facilitates the translations on the two common channel signaling networks.

GSM networks have full authentication, whereas IS-41 networks, as stated earlier, will not reach ubiquitous authentication for several years. Thus, when a subscriber "roams" into an IS-41 network, he is unprotected against technical fraud or charging when operating with Rev. A switches because of a mismatch in fraud protection. This mismatch is summarized in the table below.

| Major World-Wide Cellular Systems | |
| --- | --- |
| GSM | IS-41 (U.S.) |
| 100% Authentication | ~10% Authentication |
| Zero technical fraud | Significant technical fraud |
| Zero monetary losses from technical fraud | Significant monetary losses |
| Happy consumers | Concerned consumers |
| Not an issue for operators | Still an issue for operators |

It is understood that the voice traffic is still controlled through the public switched telephone network.

Various attempts have been made to provide methods and/or systems for authenticating subscribers. Yet, such attempts fail to provide a system and/or a method of upgrading an existing non-authenticating communications network with state of the art authentication capabilities. Alternatively, the prior art attempts fail to provide a low-cost authenticating communications network relative to the GSM network, for example.

By way of example, U.S. Pat. No. 5,557,654 to Maenpää, incorporated herein by reference, discloses a telecommunications system and method for authenticating a subscriber to permit integration of a digital cordless telephone system as a subsystem of a GSM network. Cordless telephone systems and the GSM system have different authentication procedures, preventing cordless telephone subscriber identities from being used in the GSM network. Maenpää discloses a challenge-response scheme to solve the mismatched authentication procedures.

However, such a challenge-response scheme already exists in the realm of wireless communications systems, namely, IS-41 Rev. C, which, as explained above, has thus far failed to establish ubiquitous authentication. To this end, Maenpää suggests no way to adapt his system and method to address fraud prevention in an authenticating communications network, including a dynamic self-authentication sequence generated independently of elements responsive to the authenticating communications network. That is, Maenpää fails to even suggest generating such a sequence outside of a challenge-response environment, which requires a challenge to be sent from, for example, a switching center to a communications device.

U.S. Pat. No. 5,615,267 to Lin et al., incorporated herein by reference, discloses a method for adaptively switching between two PCS authentication schemes based on caller usage patterns. Lin et al. relies on a random number sent from a personal communication service provider for cryptographic computation thereof at the handset. Both authentication schemes, however, are challenge-response schemes. Thus, like Maenpää, Lin et al. do not suggest any way to adapt their method to address fraud prevention in an authenticating communications network including a dynamic self-authentication sequence generated independently of elements responsive to the authenticating communications network. That is, Lin et al. fails to even suggest generating such a sequence outside of a challenge-response environment, which requires a challenge to be sent from, for example, a switching center to a communications device.

U.S. Pat. No. 5,617,470 to DePasquale discloses an apparatus and method for preventing access to a telephone service by unauthorized users. In DePasquale, a telephone service receives a fixed code from a user and determines whether it matches a fixed code stored in the service's memory. By definition, DePasquale's fixed code cannot be a dynamic self-authentication sequence. Therefore, DePasquale cannot even suggest an authenticating communications network including a dynamic self-authentication sequence.

U.S. Pat. No. 5,636,271 to Paterno et al. discloses an autodialer card for tonal entry of PIN codes into a telephone. Paterno et al.'s card is pre-programmed with a fixed audible tone sequence. The autodialer card includes a keypad entry for inputting a security code to operate the card and by extension to prevent unauthorized use of the card. Paterno et al. make no mention of a card storing a dynamic tone sequence, for example, one that changes with time. Thus, not surprisingly, Paterno et al. make no mention, for example, of an authenticating communications network including their card having a dynamic tone sequence in the network.

U.S. Pat. No. 5,638,423 to Grube et al. discloses a communications apparatus, which prevents unauthorized use of a communications device. Grube et al. discloses a proximity user card, which, when within twenty feet of the communications device, communicates with the communications device over a RF path to notify the communications device of its proximity thereto.

Grube et al.'s background information discloses communication devices having an encryption key and an algorithm programmed into the radio portion of the communications device. However, nowhere is there any indication of the proximity user card including the encryption key and the algorithm to ensure authorized use of the communications device. To this end, Grube et al. fail to even suggest such a proximity user card, for example, storing a dynamic value, for example, one that changes with time, and generating the dynamic self-authentication value independently of elements responsive to the authenticating communications network.

U.S. Pat. No. 5,642,401 to Yahagi discloses a challenge-response authentication system. When a base station determines that authentication is required, an authentication calculation request is generated with respect to a mobile station with a random number generated as an authentication random number by the base station. An authentication calculation result as a response from the mobile station is received by the base station. Because Yahagi's authentication random number is generated at the base station, Yahagi does not teach, for example, a dynamic self-authentication sequence generated independently of elements responsive to the authenticating communications network. Interestingly, Yahagi also fails to disclose identifying the mobile station, thereby preventing the communications network from registering the subscriber.

U.S. Pat. No. 5,668,875 to Brown et al. discloses a method and apparatus for authenticating a roaming subscriber. According to Brown et al., a subscriber receives a challenge that is in a format of a local authentication protocol, and determines whether the local authentication protocol is the subscriber's home system authentication protocol. If not, the subscriber converts the challenge to a format compatible with its home system authentication protocol, and processes the converted challenge with the subscriber's secret key and authentication algorithm into an authentication response. The authentication response is converted to be compatible with the local authentication protocol and transmitted to a local system communication unit. Fundamentally, Brown et al. is a challenge response scheme, which does not, for example, teach an authenticating communications network including a dynamic self-authentication sequence generated independently of elements responsive to the network. That is, Brown et al. fails to even suggest generating such a sequence outside of a challenge-response environment, which requires a challenge to be sent from, for example, a switching center to a communications device.

U.S. Pat. No. 7,754,952 to Hodges discloses a central authentication platform to which all calls placed from selected MINs are directed. The central authentication platform engages in challenge-response authentication with local processors that are interfaced to the wireless telephones from which non-fraudulent calls originate. Thus, Hodges cannot teach, for example, an authenticating communications network including a dynamic self-authentication sequence generated independently of elements responsive to the network. That is, Hodges fails to even suggest generating such a sequence outside of a challenge-response environment, which requires a challenge to be sent from, for example, a switching center to a communications device.

U.S. Pat. No. 5,794,139 to Mizikovsky et al. discloses an apparatus and method for automatically generating an authentication key in a mobile station. Mizikovsky et al.'s apparatus and method benefit installers of mobile stations and customer service representatives of cellular service provider by avoiding manual entry of the authentication key, which may be susceptible to entry error, inadvertent divulgence, and intentional divulgence. Mizikovsky et al. mentions use of a CAVE algorithm, which is used in challenge-response systems, such as IS-41 Rev. C. In any event, there is no teaching in the Mizikovsky et al. patent of an authenticating communications network including a dynamic self-authenticating sequence generated independently of elements responsive to the network.

In view of the existing communication networks and the shortcomings that we have observed in prior art authentication techniques, we have determined that it would be desirable to have a system and/or method of providing authentication capabilities to, for example, a currently non-authenticating communications network. We have also realized that it is desirable to address, from a fraud perspective, the mismatch between authenticating and non-authenticating wireless communications networks, or network elements, including, but not limited to, the mismatch between GSM and IS-41 networks.

We have further determined that it would be desirable to have a system and/or method of authenticating subscribers in non-authenticating wireless networks, thereby providing fraud protection with the potential to be roughly equivalent to, or superior to, that of GSM and CAVE-based IS-41 networks.

We have also determined that it would be desirable to provide a method and/or a system whereby a subscriber advantageously carries a cryptographic token, a dynamic PIN (personal identification number) generator, which is authenticated at a central host computer. This determination is based at least in part on our realization of the following problem discussed below.

We have recognized another problem with existing communication networks, namely, hijacking. A hijacking perpetrator "steals" an established voice channel as follows. First, the hijacker scans airborne signals waiting for a legitimate subscriber to initiate or to receive a call, and to pass any authorization checks. Next, the hijacker overpowers the subscriber's phone, and usurps control of (or "hijacks") the voice channel. The hijacker then calls a third party, the desired destination, and drops the original call leg.

In view of the hijacking problem, we have determined that it would also be desirable to have a system and/or method of authenticating a subscriber to a communications network and thwarting such a would-be hijacker.

SUMMARY OF THE INVENTION

It is therefore, a feature and advantage of the instant invention to address, from a fraud perspective, the mismatch between authenticating and non-authenticating wireless networks, or network elements, including but not limited to, the mismatch between GSM and IS-41 networks.

It is another feature and advantage of the present invention to authenticate subscribers in non-authenticating wireless networks, thereby providing fraud protection with the potential to be roughly equivalent to, or superior to, that of GSM and CAVE-based IS-41 networks.

It is also a feature and advantage of the instant invention to provide a method and/or a system whereby a subscriber carries a cryptographic token, such as a dynamic personal identification number (PIN) generator, which is authenticated at a central host computer. The user or subscriber may enter a PIN when placing a call and is either denied or allowed access. This token-based authentication may be performed on at least one call or registration when accessing mobile switching centers that do not support authentication. This invention further may also be used as a back up or secondary authentication mechanism. This invention supports the interworking of authenticating an non-authenticating networks or network elements and supports a constant blanket of cryptographic coverage for subscribers.

More specifically, the instant invention provides a system for validating an identity of a subscriber in a communications network. The system includes at least one communication server having a database mapping valid communications device identification numbers to respective cryptographic keys, an input including a device identification number, and an output including a valid cryptographic key mapped thereto, if the possible device identification number is included in the database.

The system also includes at least one authentication server including a first time-varying element for generating a time-varying value, and a processor. The time-varying element may be a clock, counter, and/or derivative thereof. The authentication server receives the valid cryptographic key from the communication server. The processor cryptographically processes the cryptographic key and the time-varying value to generate one or more acceptable, dynamic personal identification numbers. The processor compares for identity the acceptable generated personal identification number or numbers with a dynamic personal identification number to validate an identity of a subscriber. The dynamic personal identification number is generated independently of the communications server, the authentication server, and elements responsive to the communications network. Such elements may include, for example, a mobile switching center.

Advantageously, the system optionally also includes an interoperability unit translating communication signals between the communications network in which the subscriber is located and one or more other communications networks. The interoperability unit communicates with the communication server and/or the authentication server.

The system may also include one or more protocol analyzers connecting one or more communication networks to the interoperability unit. The protocol analyzer or analyzers convert a data format of received communications messages into a data format readable by the interoperability unit and queue the converted communications messages for the communications server.

The system may advantageously include one or more password generators cryptographically processing two or more inputs. The inputs include a second time-varying element and a cryptographic key also found in the above-mentioned database to generate an output including the dynamic personal identification number. As above, the time-varying element may include a clock, a counter, and/or a derivative thereof.

The system may further include one or more communications devices communicating with the communications network and with the communications server. Each such communications device includes one or more input elements for receiving the dynamic personal identification number from the password generator. The password generator may include a display for displaying the dynamic personal identification number, and the communication device may include a keypad.

The password generator may include a transmitter for transmitting one or more electromagnetic signals including the dynamic personal identification number to the communications device. The communications device may include a receiver for receiving the one or more electromagnetic signals including the dynamic personal identification number from the password generator. The transmitter may include a photo-emitter, and the receiver may include a photo-detector.

The password generator may include a tone encoder and/or a pulse encoder operatively connected to the transmitter. The communications device may include a tone decoder and/or a pulse decoder, respectively, operatively connected to the receiver.

In accordance with another embodiment of the present invention, a method of validating an identity of a subscriber in a communications network is provided. The method includes the following sequential, non-sequential, or independent steps. A dynamic personal identification number, generated independently of an authentication engine and elements responsive to the communications network, is transmitted from a communications device to the authentication engine remotely located thereto. One or more acceptable personal identification numbers are compared to the transmitted dynamic personal identification number for validating the identity of a subscriber at the authentication engine.

The method optionally further includes the following steps. The subscriber is provided with access to the communications network, if identity of the at least one acceptable personal identification number and the transmitted dynamic personal identification number exists. The subscriber is denied access to the communications network, if identity of the at least one acceptable personal identification number and the transmitted dynamic personal identification number does not exist.

The method may further include the following sequential, non-sequential, or independent steps. A device identification is transmitted from the communications device to the authentication engine prior to transmitting the dynamic personal identification number. The dynamic personal identification number is generated by using a password generator to process a time-varying input, a cryptographic key input, and a cryptographic algorithm. The password generator is operatively independent of the authentication engine and the elements responsive to the communications network. A cryptographic key corresponding to the transmitted device identification is determined from a database in the authentication engine mapping valid device identifications to respective cryptographic keys.

The determined cryptographic key and a time-varying value are cryptographically processed at the authentication engine to generate one or more acceptable personal identification numbers. The step of transmitting the dynamic personal identification number may include transmitting the dynamic personal identification number to the authentication engine via a mobile switching center in the communications network.

The authentication engine may include a communications server and an authentication server communicating therewith. The communications server, may include the mapping database, receive the device identification number, and perform the step of determining a cryptographic key corresponding to the received device identification number. The authentication server may perform the personal identification number comparing step.

Advantageously, the method may further include the following steps. Communication signals may be translated between the communications network in which the subscriber is located and at least one other communications network by using an interoperability unit. The interoperability unit may be communicating with the communication server and/or the authentication server.

The authentication engine may alternatively include a communications and authentication server, which in turn includes the mapping database. The communications and authentication server may receive the device identification number, perform the step of determining a cryptographic key corresponding to the received device identification number, and perform the personal identification number comparing step.

It is also a feature and advantage of the instant invention to provide a system and/or method of authenticating a subscriber to a communications network and thwarting a would-be hijacker, as defined above.

More specifically, the instant invention provides a system for validating an identity of a subscriber in a communications network. The system includes one or more communication servers, each including a database mapping valid communications device identification numbers to respective cryptographic keys. An input to the system includes a possible device identification number. An output may include a valid cryptographic key mapped thereto, if the possible device identification number is included in the database. The system includes one or more authentication servers, each including a first time-varying element for generating a time-varying value, and a processor. The time-varying element may include a clock, a counter, and/or a derivative thereof. The authentication server receives the valid cryptographic key from the communication server.

According to this embodiment, the processor cryptographically processes the cryptographic key and the time-varying value to generate one or more acceptable, dynamic personal identification numbers. The processor compares for identity the acceptable generated personal identification number or numbers with a dynamic personal identification number to validate an identity of a subscriber. The dynamic personal identification number is generated independently of the communications server, the authentication server, and elements responsive to the communications network.

The system also includes an interoperability unit translating communication signals between the communications network in which the subscriber is located and at least one communications network. The interoperability unit communicates with the communication server and/or the authentication server. The authentication engine obtains a profile of the subscriber upon validating the identity thereof. The authentication engine modifies the profile of the subscriber to restrict the subscriber to a number of authorized calls to a subscriber-desired telephone number and/or a subscriber-desired communications network address. For example, the number of authorized calls may be one, two, or more. The authentication engine transmits the modified profile to a mobile switching center serving the subscriber, thereby instructing the mobile switching center to enable subscriber access to the subscriber-desired telephone number or the subscriber-desired communications network address for the restricted number of authorized calls.

The system may further include one or more protocol analyzers connecting one or more of the communication networks to the interoperability unit. Each protocol analyzer converts a data format of received communications messages into a data format readable by the interoperability unit and queues the converted communications messages for the communications server.

The system may also include one or more password generators, which cryptographically processes two or more inputs. The inputs include a second time-varying element and at least one of the cryptographic keys to generate an output comprising a personal identification number.

The system may further include one or more communications devices, each communicating with the communications network and with the communications server. Each communications device includes one or more input elements for receiving the dynamic personal identification number from the password generator. The password generator may include a display for displaying the dynamic personal identification number.

The password generator may include a transmitter for transmitting one or more electromagnetic signals including the dynamic personal identification number to the communications device. The communications device includes a receiver for receiving the electromagnetic signal or signals including the dynamic personal identification number from the password generator. The transmitter may include an photo-emitter, and the receiver may include a photo-detector. In addition to, or alternatively, the password generator may include a tone encoder and/or a pulse encoder operatively connected to the transmitter. The communications device may include a tone decoder and/or a pulse decoder, respectively, operatively connected to the receiver.

In accordance with another embodiment of the present invention, a method of validating an identity of a subscriber in a communications network is provided. The method includes the following sequential, non-sequential, or independent steps. A dynamic personal identification number, generated independently of an authentication engine and elements responsive to the communications network, is transmitted from a communications device to the authentication engine remotely located thereto. One or more acceptable personal identification numbers are compared for identity or substantial coincidence to the transmitted dynamic personal identification number for validating the identity of a subscriber at the authentication engine. The subscriber is restricted to a number of authorized calls to a subscriber-desired telephone number and/or a subscriber-desired communications network address.

The method may further comprise the following steps. The subscriber is provided with access to the communications network, if identity of the at least one acceptable personal identification number and the transmitted dynamic personal identification number exists. The subscriber is denied access to the communications network, if identity or substantial coincidence of the at least one acceptable personal identification number and the transmitted dynamic personal identification number does not exist.

The method may also include the following sequential, non-sequential, or independent steps. A device identification is transmitted from the communications device to the authentication engine prior to the dynamic personal identification number transmitting step. The dynamic personal identification number is generated by using a password generator to process a time-varying input, a cryptographic key input, and a cryptographic algorithm. The password generator is independent of the authentication engine and the elements of the communications network. A cryptographic key corresponding to the transmitted device identification is determined from a database in the authentication engine, mapping valid device identifications to respective cryptographic keys. The determined cryptographic key and a time-varying value are cryptographically processed at the authentication engine to generate one or more acceptable personal identification numbers.

The authentication engine may include a communications server and an authentication server communicating therewith. The communications server may include a mapping database, receive the device identification number, and perform the step of determining a cryptographic key corresponding to the received device identification number. The authentication server performs the personal identification number comparing step.

Communication signals may optionally be translated between the communications network in which the subscriber is located and at least one other communications network by using an interoperability unit communicating with the communication server and/or the authentication server.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

DETAILED DESCRIPTION OF THE PREFERRED EMBODIMENTS

Figure 1:
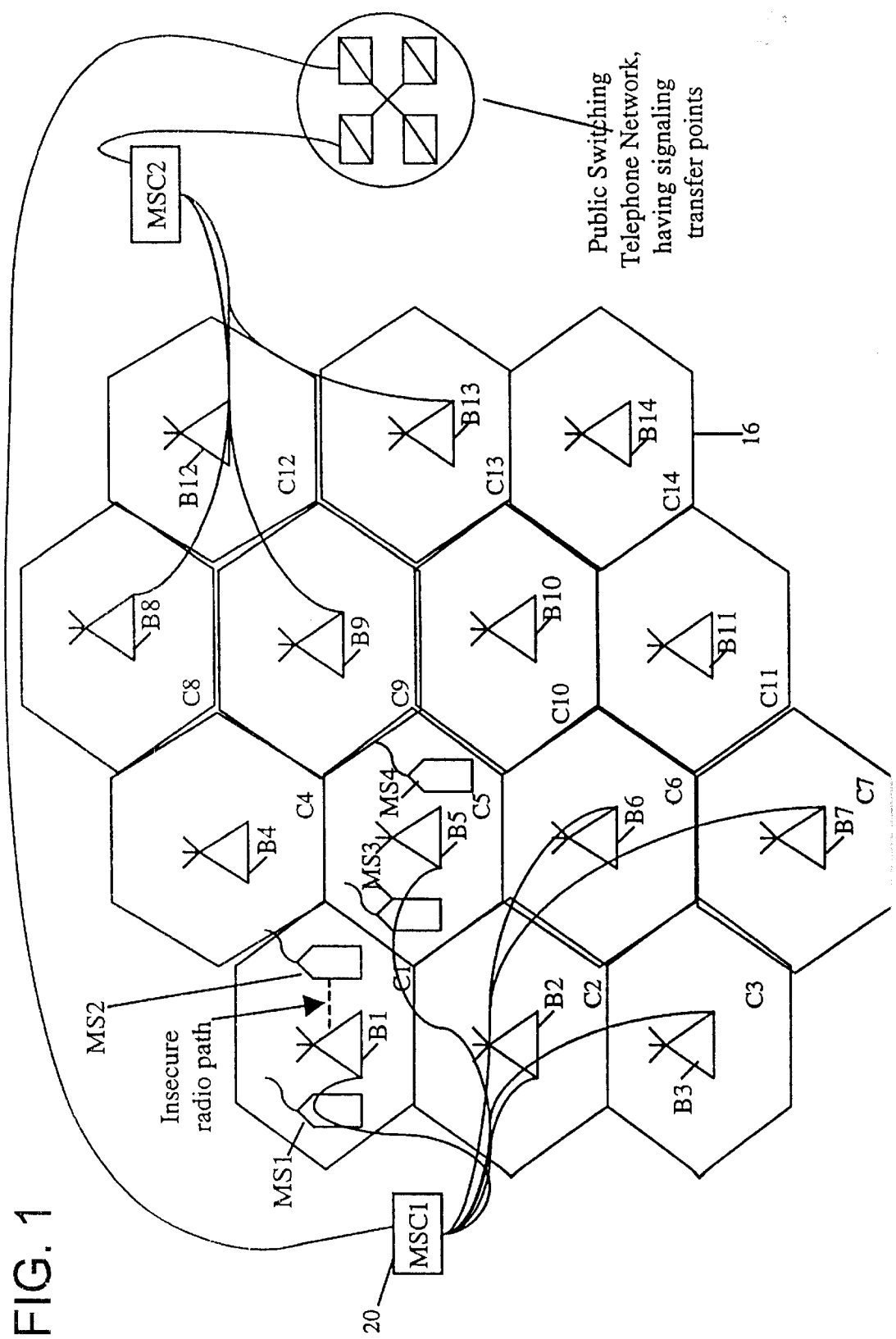
FIG. 1 is a schematic of a standard wireless cellular radio system.
Figure 2:
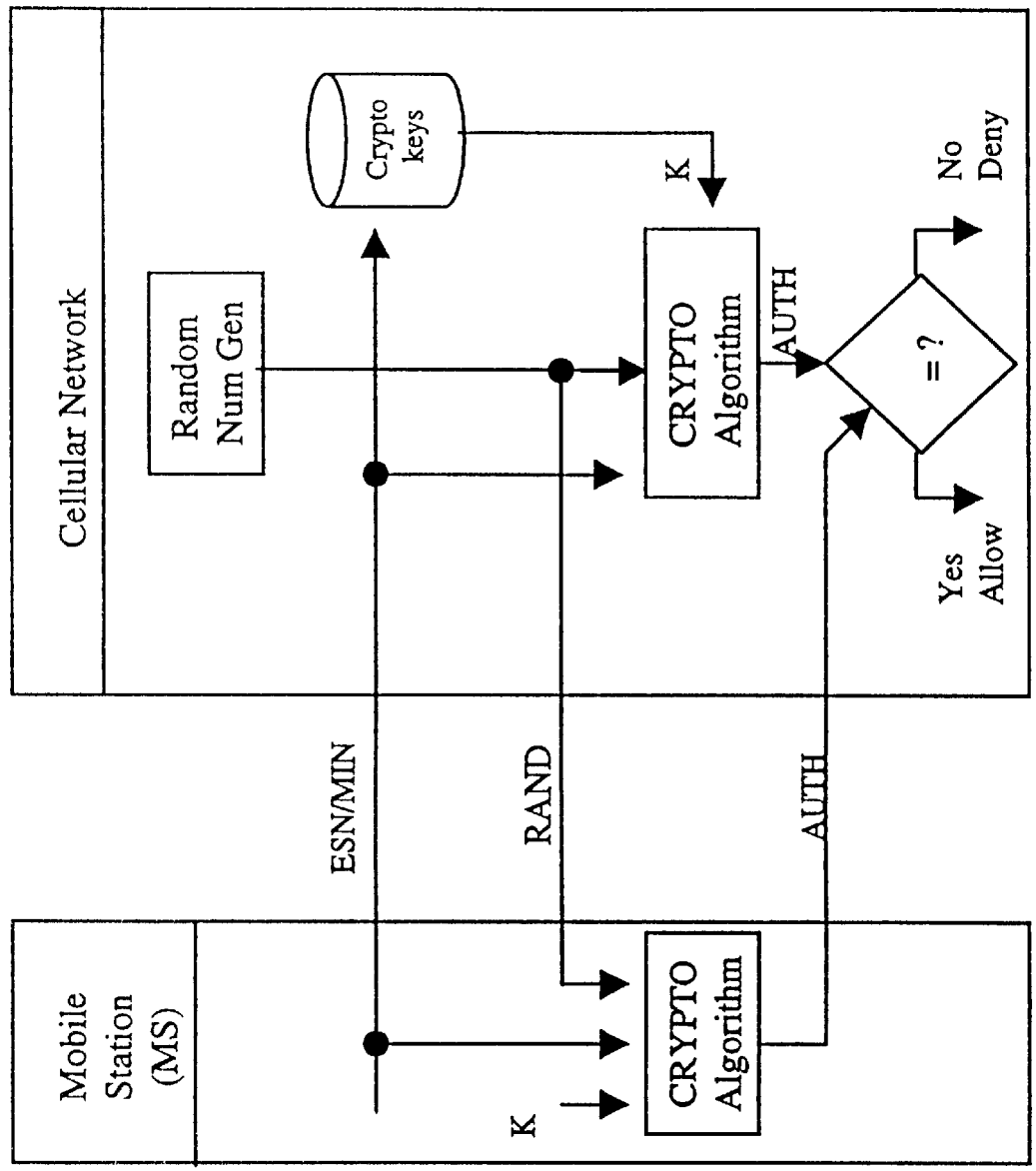
FIG. 2 is a schematic of a prior art "challenge-response" authentication scheme.
Figure 3:
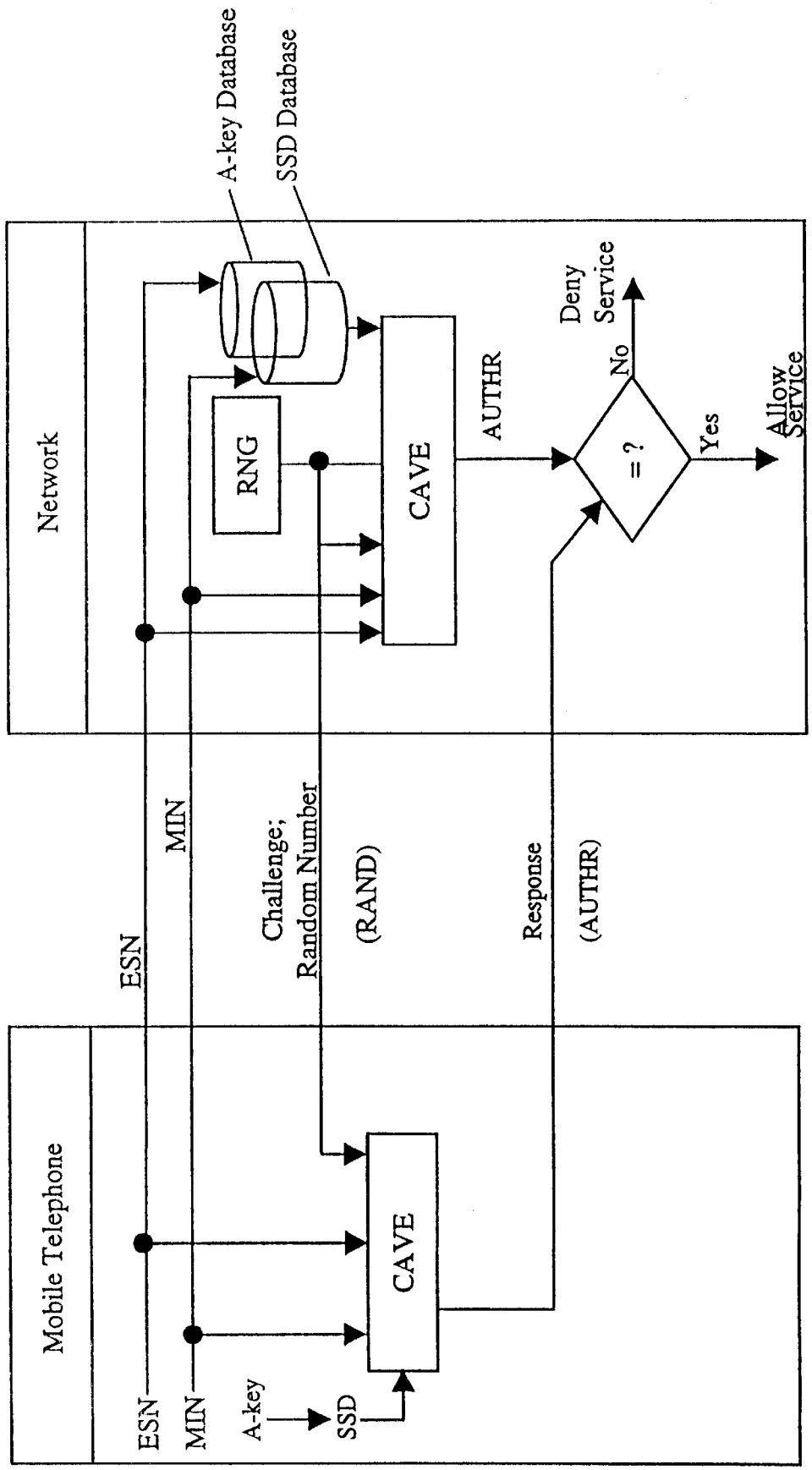
FIG. 3 is a schematic of a prior art IS-41 Rev. C-based "challenge-response" authentication scheme.
Figure 4:
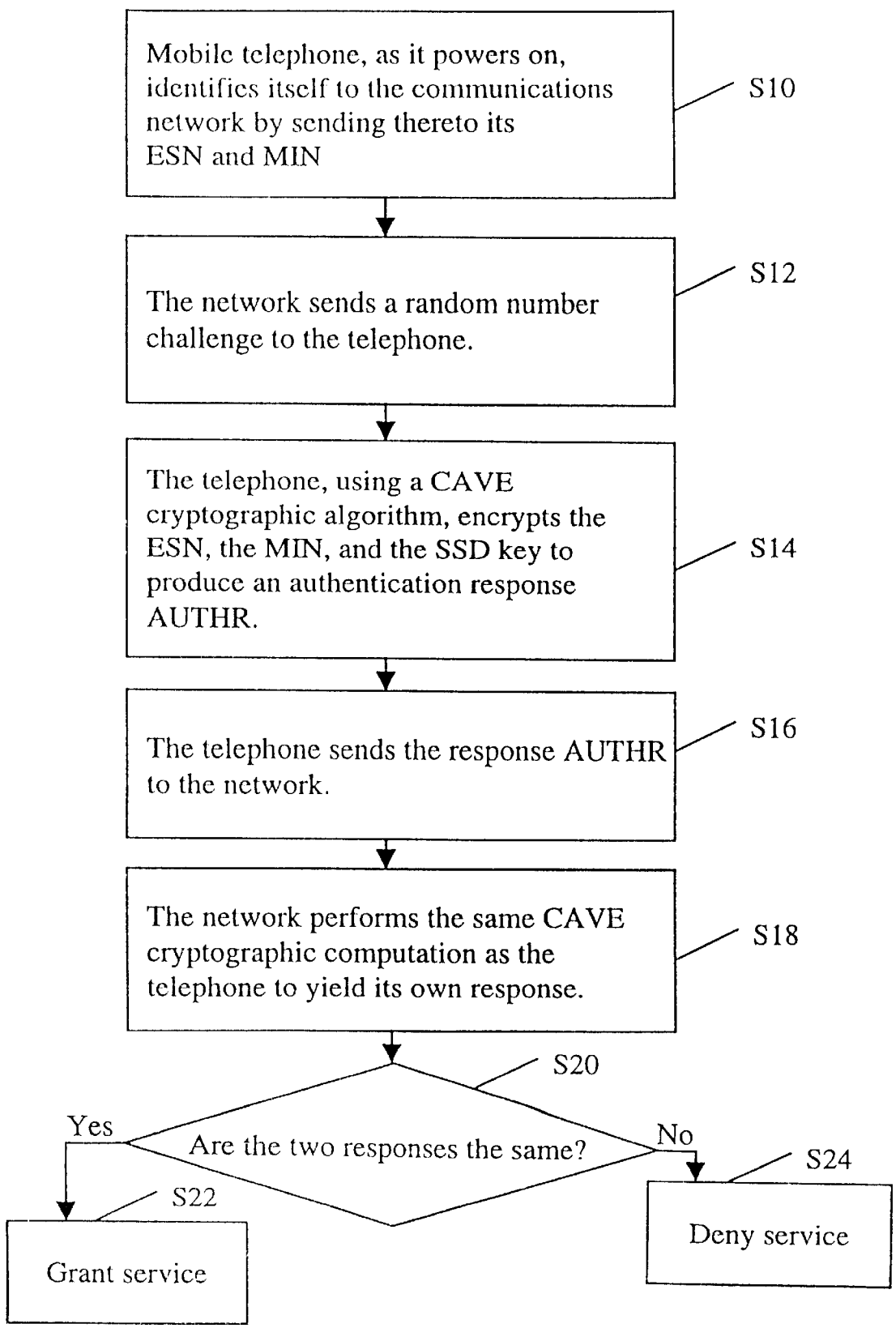
FIG. 4 is a flow chart outlining the process steps of the scheme shown in FIG. 3.
Figure 5:
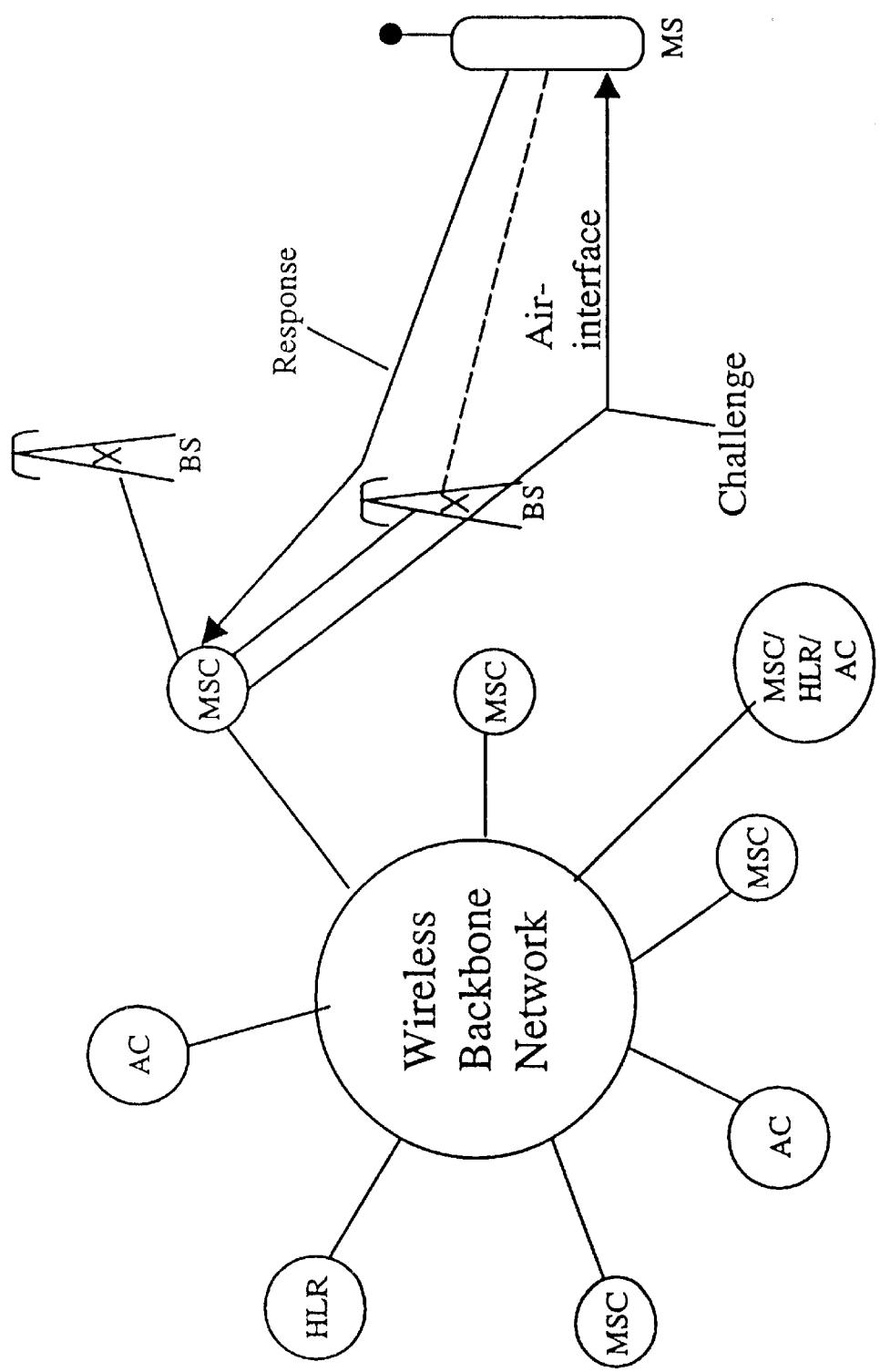
FIG. 5 is a schematic of the elements in a prior art "challenge-response" system.
Figure 6:
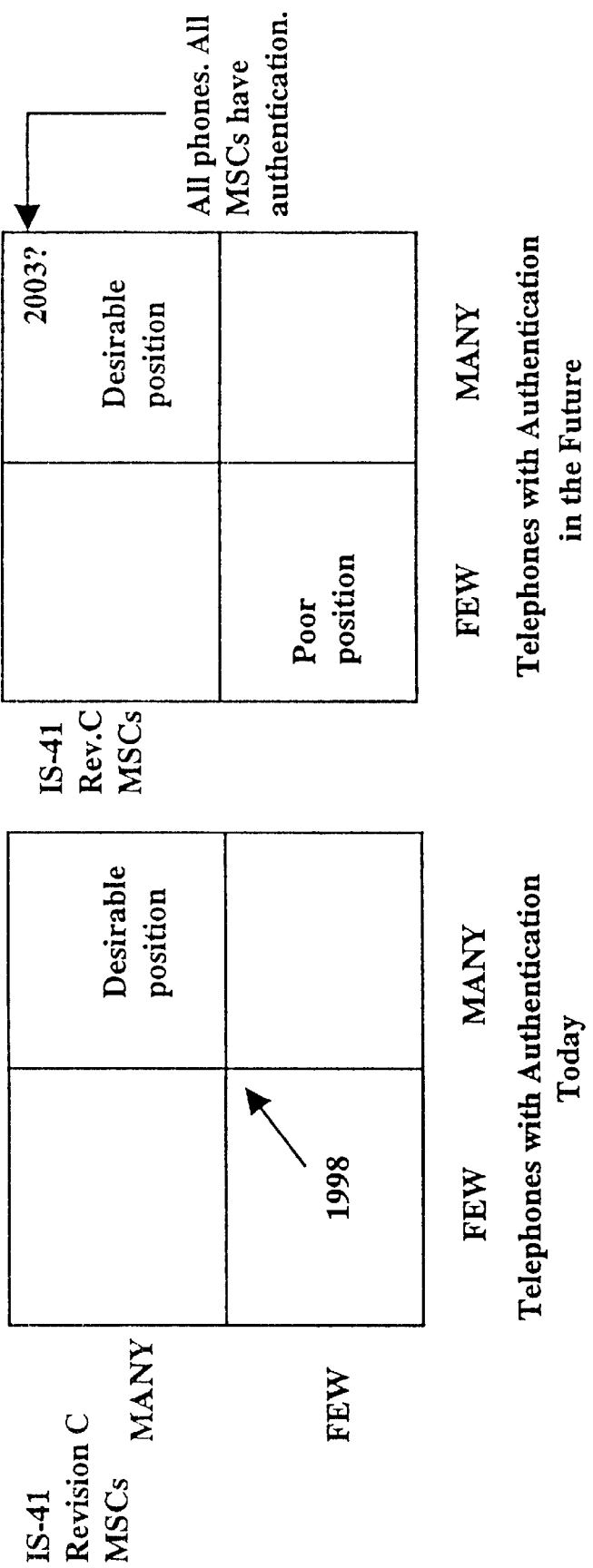
FIG. 6 shows two graphs depicting the ubiquity of telephones and mobile switching centers.
Figure 7:
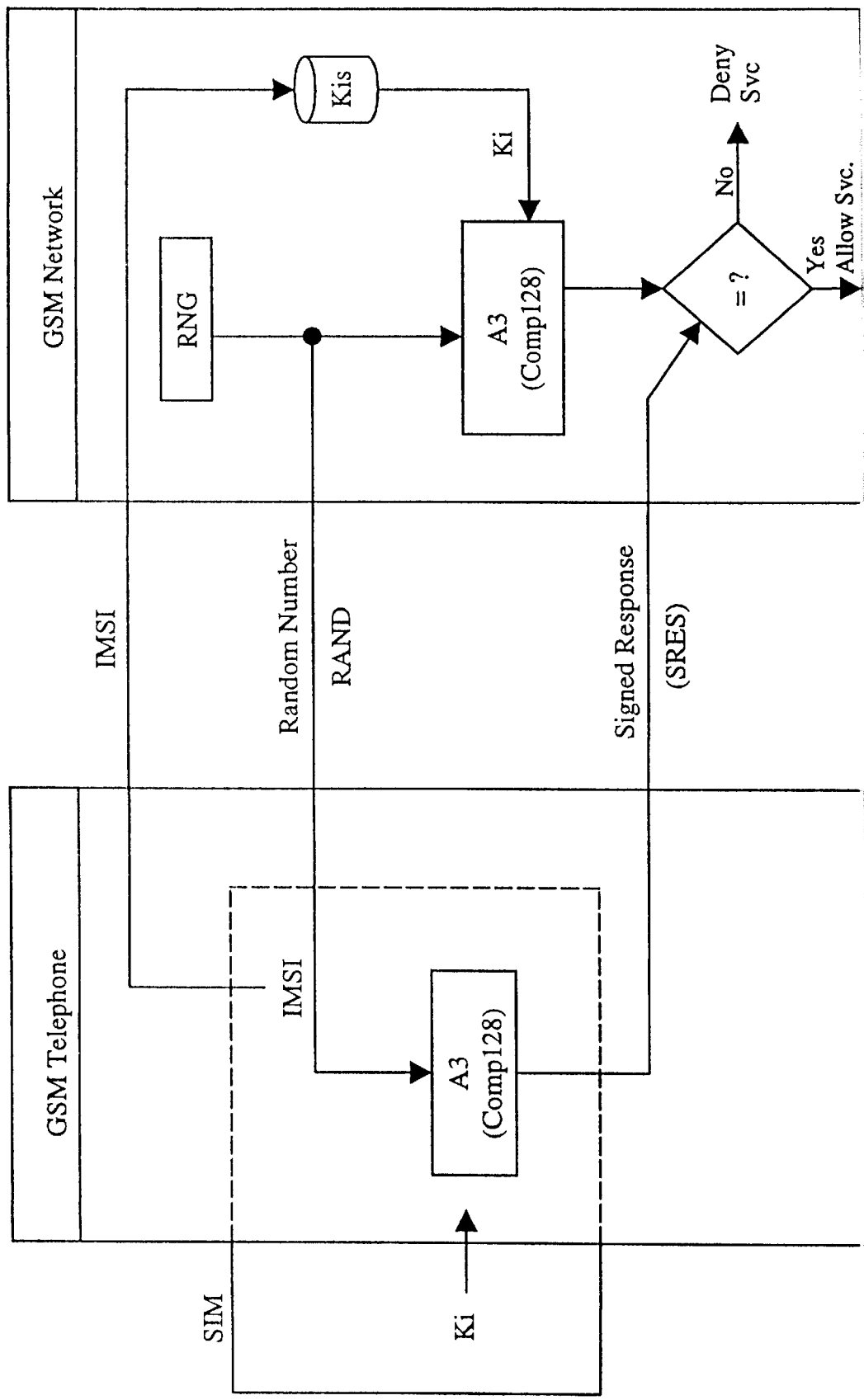
FIG. 7 is a schematic of a prior art GSM "challenge-response" authentication scheme.
Figure 8:
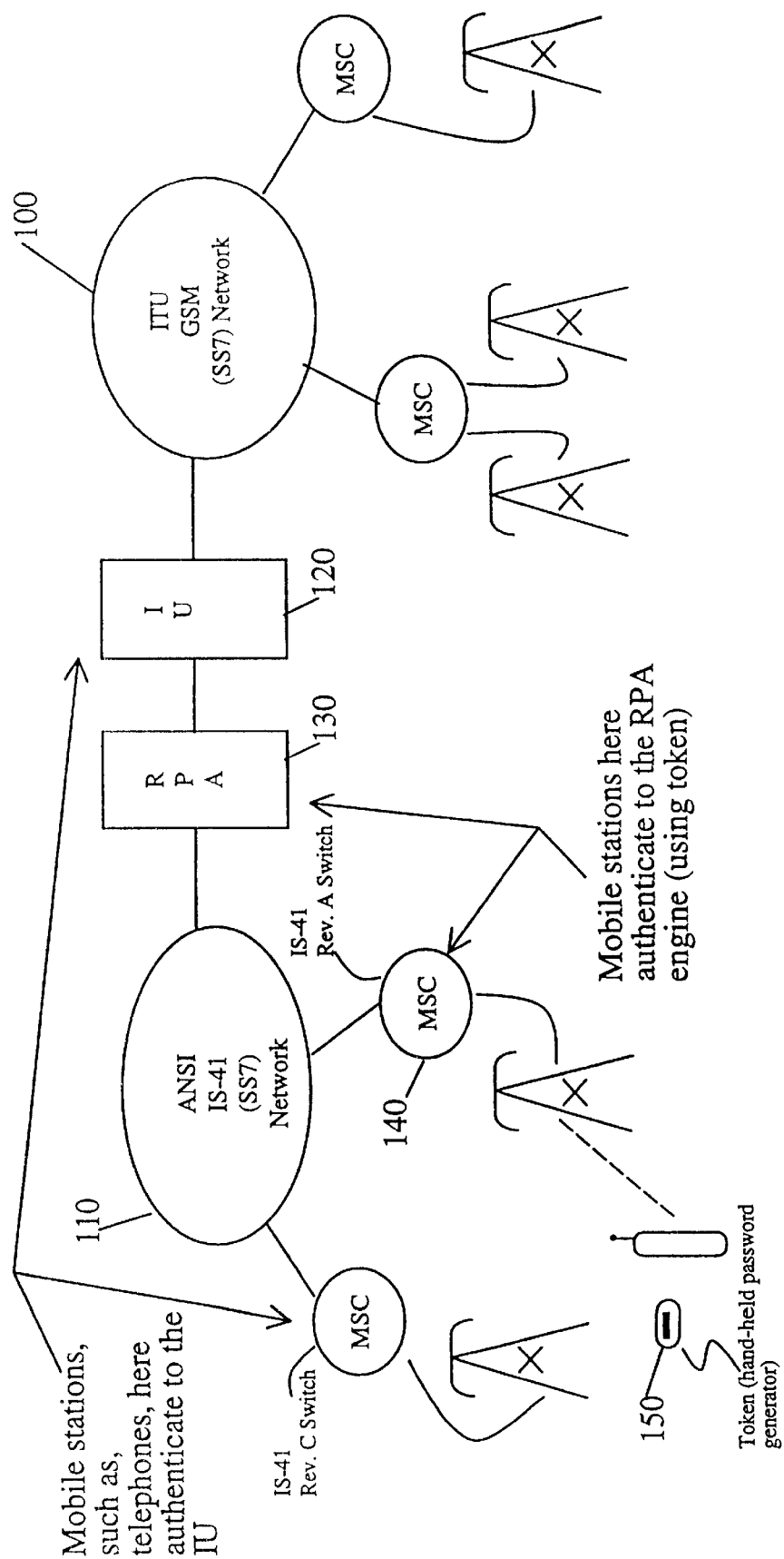
FIG. 8 is a schematic of the authenticating communications network according to the instant invention.

The invention at a high-level is depicted in FIG. 8 below through a non-limiting example, including an authenticating GSM network 100 and a non-authenticating IS-41 network 110. It should be understood, however, that this invention may be applied to any wireless network. FIG. 8 depicts the GSM 100 and IS-41 110 networks connected together through the Interoperability Unit (IU) 120 with the addition of the random PIN authentication (RPA) engine 130. The RPA engine 130 performs various functions, the most important of which is cryptographic authentication.

The RPA engine 130 is the central processor that is used in this example to authenticate wireless subscribers in the IS-41 environment 110, primarily when the local serving mobile switching center (MSC) 140 is not authentication-capable, for example, because it is not IS-41 Rev. C compatible. Also shown in FIG. 8, is the authentication token 150, which generates dynamic personal identification numbers (PINs) for the mobile station subscriber. These are passed through the system to the RPA for validation.

Figure 9:
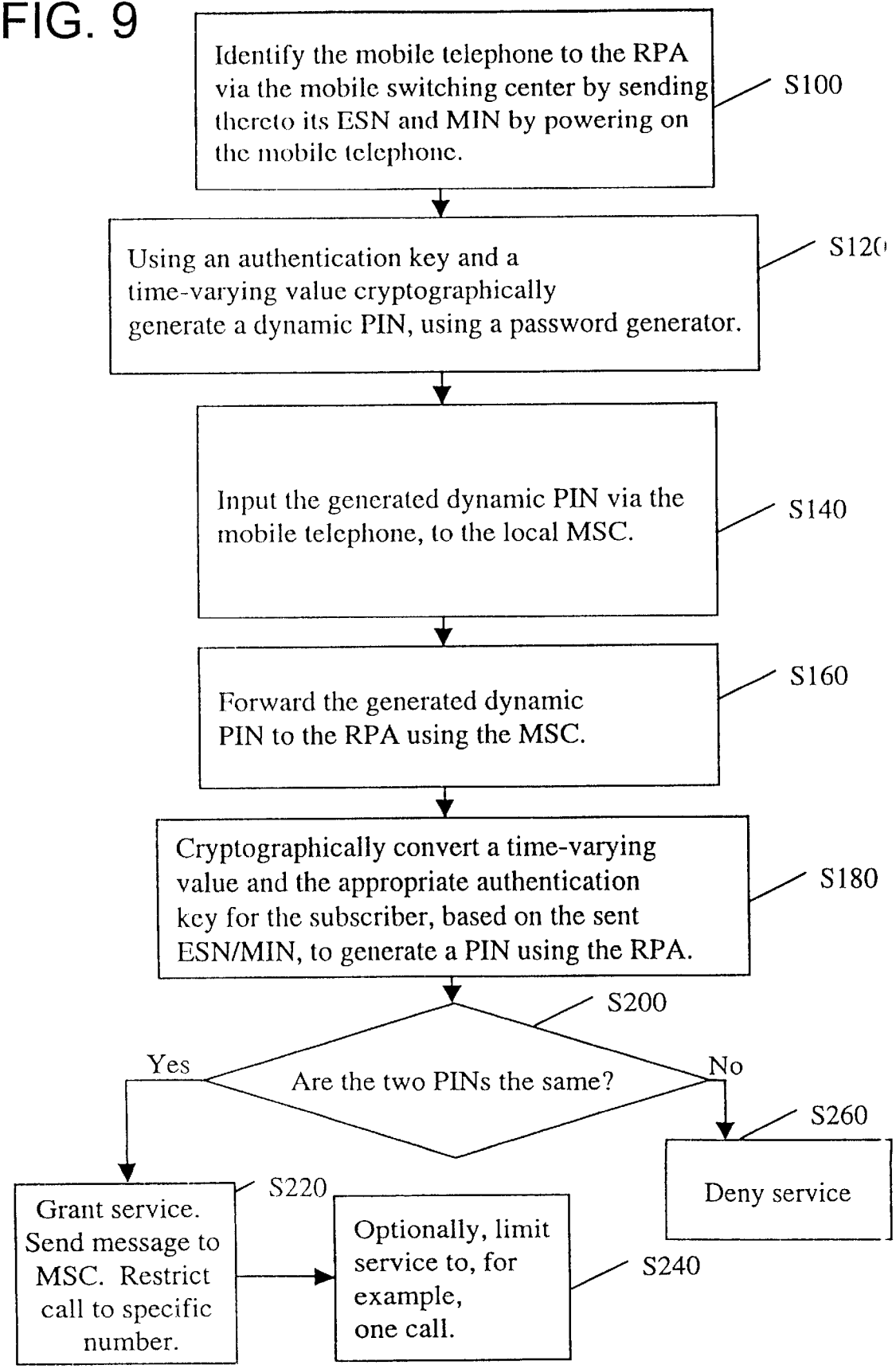
FIG. 9 is flow chart outlining the process steps of the instant invention.

Referring to FIGS. 8 and 9, the following is a high level view of the process for subscriber validation using the RPA engine and the token for, by way of example, IS-41 subscribers operating, for example, mobile telephones.

Step S100: The subscriber registers (powers on) the telephone. The local mobile switching center MSC passes information back to the RPA which communicates with the IU to gain the user's profile. The IU is acting as the subscriber's Home Location Register (HLR) in IS-41 vernacular.

Step S120: In order to validate the subscriber, the dynamic PIN is cryptographically generated by the handheld password generator from a time-varying element and a cryptographic key or a derivative of the cryptographic key.

Step S140: The generated dynamic PIN is inputted via the mobile telephone to the local mobile switching center MSC.

Step S160: The MSC substantially automatically, or after a time delay, transmits the entered sequence through the IS-41 SS7 network to the RPA.

Step S180): The RPA cryptographically converts a time-varying value and the authentication key for the subscriber corresponding to the sent ESN and MIN to generate an acceptable PIN.

Step S200: The RPA compares the acceptable PIN it generated to the dynamic PIN sent from the mobile station.

Step S220): If the PINs are the same, service to the communications network is granted. For example, the RPA may send information to the local mobile switching center (per the IS-41 Rev. A standard) that a call may be initiated. Further, the MSC may send an audible tone to the subscriber that is a "Go" tone to indicate success of identity validation.

Step S240: Optionally, as will be explained below, the RPA may limit service to a number of authorized calls, for example, one authorized call.

Step S260: If the PINs are not the same, service to the communications network is denied.

Figure 10:
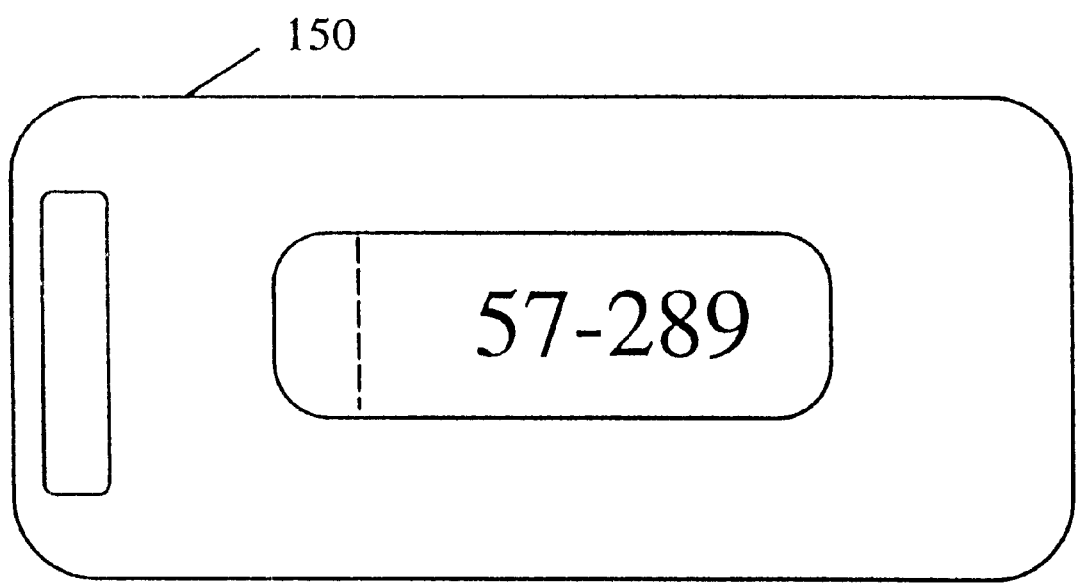
FIG. 10 is a schematic of a sample hand-held password generator consistent with the instant invention.

The authentication token 150 used in the above-mentioned embodiment may, for example, be a hand-held password generator (HPG). Such a password generator may, by way of further illustration, be embodied as an authentication token produced by Enigma Logic, Inc. of Concord, Calif., or a SecurID authentication token, from Security Dynamics Technologies, Inc. of Bedford, Mass. To this extent, an exemplary token 150 may be embodied as depicted in FIG. 10. The illustrated authentication token 150 includes, by way of example, a display showing a sample dynamic self-authentication sequence.

The RPA engine 130 includes a central processor that, in this example, is logically and/or operatively connected between the IS-41 network 110 and the IU 120. The RPA engine may receive messages from, for example, both the IS-41 network 110 including Rev. A and Rev. C MSCs and the IU 120, which is receiving messages from GSM 100 MSCs. The RPA 130 either simply passes messages to and from the IS-41 network 110 and IU 120 without modification, or makes decisions, i.e., acts upon messages, thereby modifying the message flow.

Figure 11:
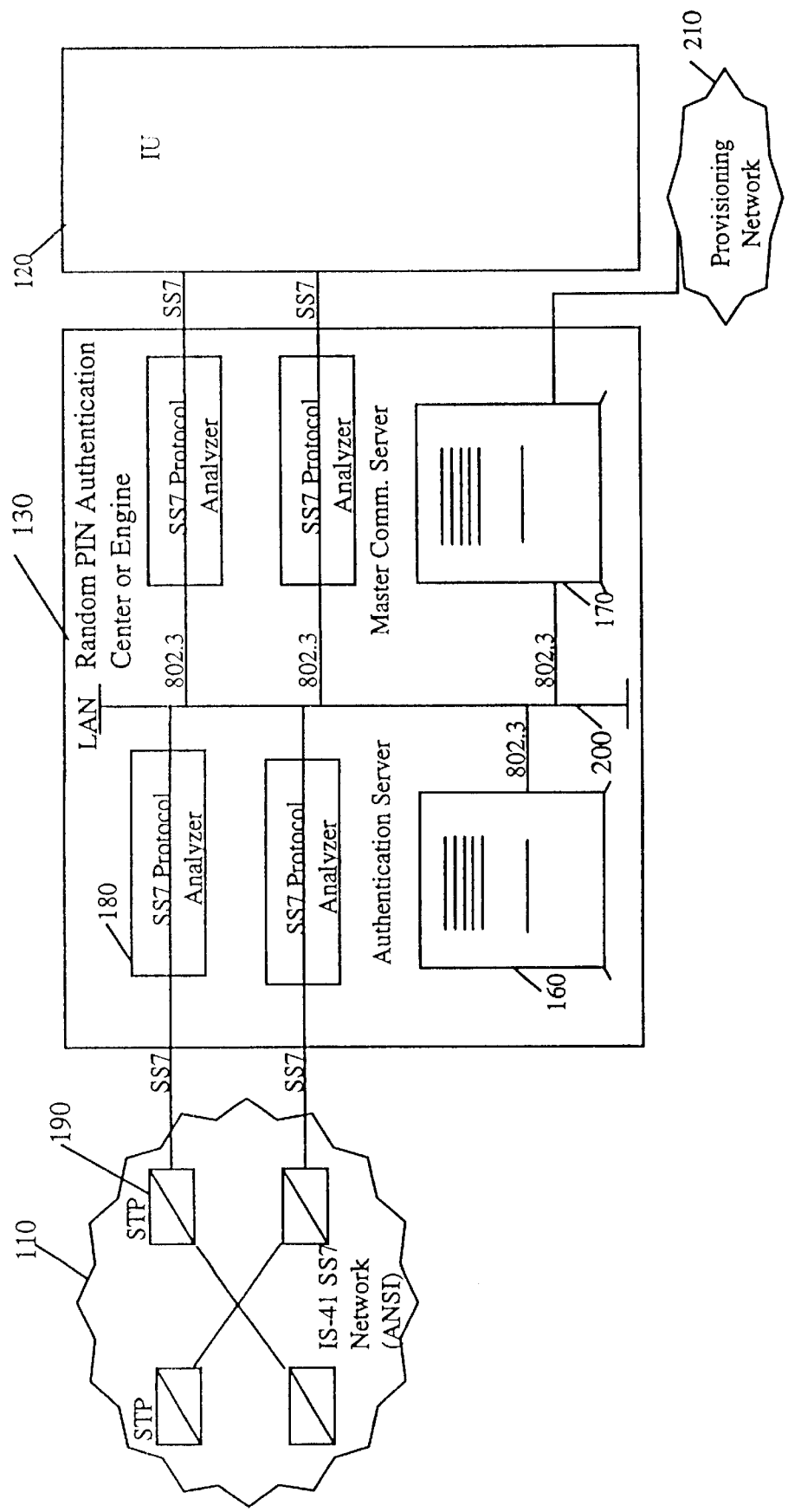
FIG. 11 is a schematic of a random PIN authentication engine according to the instant invention.

An illustrative embodiment is depicted in FIG. 11 below. It is worthy to note that the block diagram of the RPA 130 in FIG. 11 is exemplary only. The possible number of configurations is numerous to those skilled in the art. For example, a somewhat slower embodiment than the one disclosed hereinbelow includes a multiplexer and a demultiplexer implemented between two or more signaling transfer points and a respective protocol analyzer. Such a configuration would require fewer protocol analyzers 180 than the RPA 130 shown in FIG. 11.

The RPA 130 of FIG. 11 includes, among other elements, an authentication server 160 and a master communication server 170. The standard protocol analyzers 180 are used for connectivity to the existing IS-41 network 110 and the IU 120. These analyzers 180 receive messages from the IS-41 network 110 via the signaling transfer points (STPs) 190 therein destined to the IU 120 and onto GSM network 100. Analyzers 180 support the entire standard Signaling System No. 7 (SS7) protocol per ANSI (protocol stack), and are intelligent processors that act as a buffer or queue for the RPA 130.

When a message comes in, the analyzer 180 strips the message of non-essential data and provides an "interrupt" to the master communication server 130. The master communication server (MCS) 170 is connected to the other elements via a standard 802.3 local area network 200 or other standard network. The MCS 170 communicates with and provisions the authentication server 160, and performs all traffic analysis and control. Optionally, the MCS 170 communicates with a standard provisioning network 210.

The MCS 170 provisions subscribers in the authentication server 160 for validation. First, the MCS 170 loads a database of device identification numbers and cryptographic keys. These two parameter lists implement a mapping of non-secret information to "secret" information. This mapping is shown, by way of example, in the table below:

| ID to Cryptographic Key Relation Table | | | | | | | | |
|---|---|---|---|---|---|---|---|---|
| ID | Cryptographic Keys (64-bits) Shown in Hexadecimal | | | | | | | |
| 890125 | 1 | 7 | A | F | 0 | 8 | 7 | 4 |
| 890126 | 3 | A | 9 | 7 | 2 | D | 2 | C |
| 890127 | 8 | 3 | 2 | C | 1 | F | 7 | 8 |
| ID | Cryptographic Keys (64-bits) Shown in Hexadecimal | | | | | | | |
| 890125 | 9 | 0 | 1 | 6 | D | 9 | 2 | 6 |
| 890126 | 3 | 2 | F | S | 2 | C | 4 | 9 |
| 890127 | 9 | 1 | A | 7 | C | Z | E | E |

Figure 12:
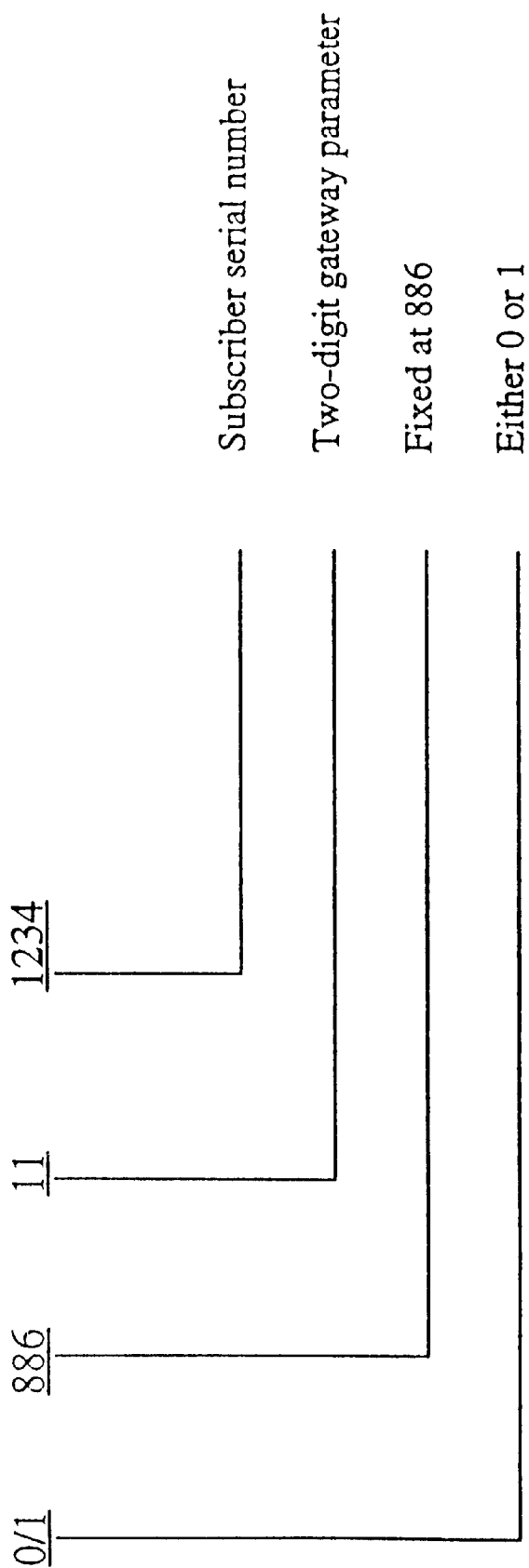
FIG. 12 is a view of a dissected sample mobile identification number.

The MCS 170 is also used for the provisioning of subscriber MINs mapped to token IDs. The MINs may include, for example, gateway and subscriber serial number parameters that have a form shown, by way of illustration, in FIG. 12.

The mapping may also include the ESN (Electronic Serial Number) if MIN uniqueness becomes a difficulty. The mapping of token IDs to MINs is shown, by way of illustration, in the table below.

| ID to MIN Relation Table | | | | | | | | | | |
|---|---|---|---|---|---|---|---|---|---|---|
| ID | MIN | | | | | | | | | |
| 890125 | 0 | 8 | 8 | 6 | 0 | 1 | 1 | 2 | 3 | 4 |
| 890126 | 0 | 8 | 8 | 6 | 1 | 0 | 7 | 6 | 5 | 1 |
| 890127 | 1 | 8 | 8 | 6 | 0 | 2 | 7 | 4 | 3 | 2 |

The mapping that occurs within the RPA after provisioning is shown, by way of example, in the table below.

Alternatively, the RPA 130 may be located in a geographically convenient mobile switching center in a communications network. In yet another embodiment, the RPA 130 may be located in an interoperability unit, which connecting two or more communications networks.

In accordance with another embodiment of the instant invention, to prevent "hijacking," the instant system may optionally "hotline" a user to a desired number. "Hotlining," in common parlance, involves connecting the user to only a predetermined telephone number or destination number. We have recognized that, in a communications network, limiting a user to a predetermined number is neither commercially palatable nor practical for most users.

However, we have also realized that such hotlining would thwart hijackers, if the communications network would invariably connect even a hijacked call to the telephone number or destination number requested by a valid sub-

| MIN to Cryptographic Key Relation Table | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| MIN | | | | | | | | | | | CRYPTOGRAPHIC KEY | | | | | | | | | | | | | | | | | | | | |
| 0 | 8 | 8 | 6 | 0 | 1 | 1 | 2 | 3 | 4 | 1 | 7 | A | F | 0 | 8 | 7 | 4 | 9 | 0 | 1 | 6 | D | 9 | 2 | 6 | | | | | | |
| 0 | 8 | 8 | 6 | 1 | 0 | 7 | 6 | 5 | 1 | 3 | A | 9 | 7 | 2 | D | 2 | C | 3 | 2 | F | 5 | 2 | C | 4 | 9 | | | | | | |
| 1 | 8 | 8 | 6 | 0 | 2 | 7 | 4 | 3 | 2 | 8 | 3 | 2 | C | 1 | F | 7 | 8 | 9 | 1 | A | 7 | C | 2 | E | E | | | | | | |

Figure 13:
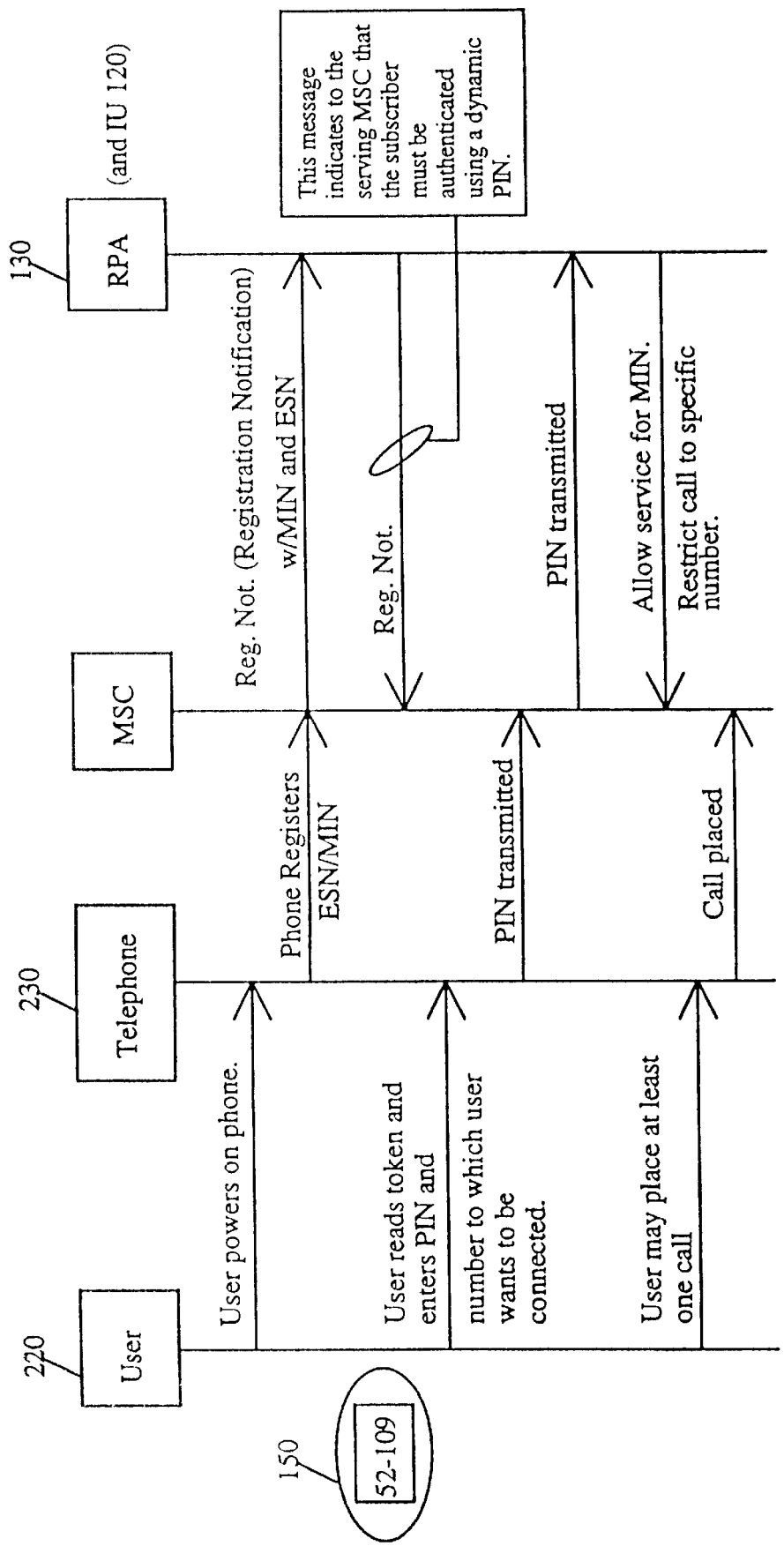
FIG. 13 is a schematic of the signaling flows consistent with the instant invention.

This table illustrates the relationship of MINs to cryptographic keys, which are secret information. Again, the subscriber is identified via, for example, the MIN which is sent to the RPA 130 where the secret key is stored. Optionally, both the MIN and the ESN, or perhaps just the ESN, may be used as the identification parameter to determine the appropriate cryptographic key for the calling subscriber. A simplified view of the signaling flows between the user 220 operating a mobile station, such as a telephone 230, and the RPA 130 is illustrated in FIG. 13.

Figure 14:
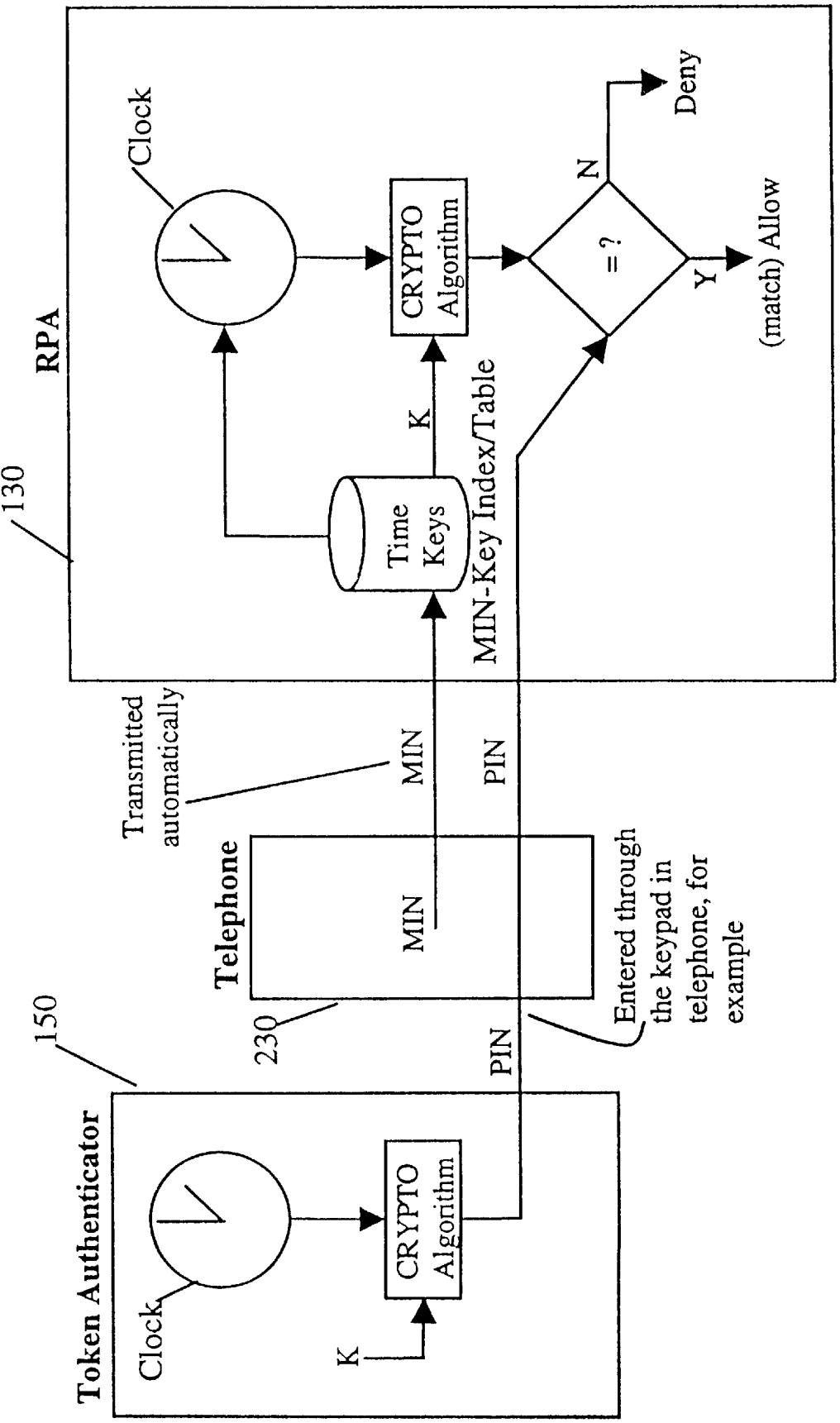
FIG. 14 is a schematic showing the interrelationship between the token, the telephone, and the random PIN authentication engine according to the instant invention.

Within the RPA 130, the authentication server 160 is used to validate the subscriber using the MIN as an identification parameter and the dynamic PIN. The interworkings of the token 150 and the RPA 130 including the authentication server 160 are shown conceptually in FIG. 14.

Configured as described, the RPA engine 130 may advantageously authenticate subscribers in otherwise non-authenticating communications networks, such as IS-41 Rev. A markets that do not support the CAVE-based authentication, for example. All call originations may be authenticated as well as any network requests, and attempts at cloning for purposes of theft of service are thwarted. Since the dynamic PIN is cryptographically generated based on a value derived from a time-varying element and a secret key, the response is non-deterministic. That is, an interloper cannot predict the next PIN. The probability of simply guessing the correct response is based on the length of the PIN, and can be extremely small.

Advantageously, the RPA 130 may be modular so as to be locatable anywhere feasible in the communications network. That is, the RPA 130 may, for example, be located in a distinct authentication center operatively connected to a communications network. Advantageously, such a configuration would facilitate initial implementation of the RPA 130 by rendering modifications to existing network elements substantially unnecessary. Further, such a configuration would facilitate an upgrade or repair of the RPA by avoiding disrupting operation of other communications network elements. Both of these advantages may be significant, particularly, if the mobile switching centers and/or the interoperability unit are owned by a distinct entity from the owner of the RPA.

scriber. Further, we have recognized that at least in some communications networks, mobile switching centers, for example, and/or interoperability units, for example, include modifiable network user profiles. We have determined that modifying an authenticated user's profile to the authenticated user's desired telephone number or destination number would restrict any authorized call to the desired telephone number or destination number.

Thus, according to this embodiment of the instant invention, a user may type a sequence into the mobile station including a random PIN read from an authentication token 150 (or hand-held password generator—HPG) and the telephone number or other destination number of the entity he chooses to call. The sequence, a "feature code" sequence is recognized by the serving mobile switching center and the sequence (i.e., PIN and dialed digits) are passed to the central authentication server, which may be located at, for example, an authentication center or other location.

The authentication center (AC) verifies that the PIN is correct for this user. The AC or random pin authentication engine 130 (which together is known as RPA/AC) communicates with the IU 120, for example, and obtains the user's profile. The AC modifies the profile to restrict the user to, for example, a number of calls, for example, one call, that call being the number sent by the user in his dialing sequence. The AC sends the "restricted" profile to the serving mobile switching center which is effectively instructed to "hotline" the subscriber to that specific number. The user 220 then places a second call. This call is automatically routed to the "hotline" number provided in the profile. This technique using two-stage authentication dialing thwarts fraudulent use of telephone network, and in particular, "hijacking."

The user 220 powers on the mobile station 230. The mobile station cycles through normal call processing. The user 220 types the first sequence into the phone, for example:

*66 15 7 86 #202 555 1212-send

The user waits, for example, for 10 seconds or until a confirmation tone is sent. Then he enters the second sequence of digits:

66-send

Figure 15:
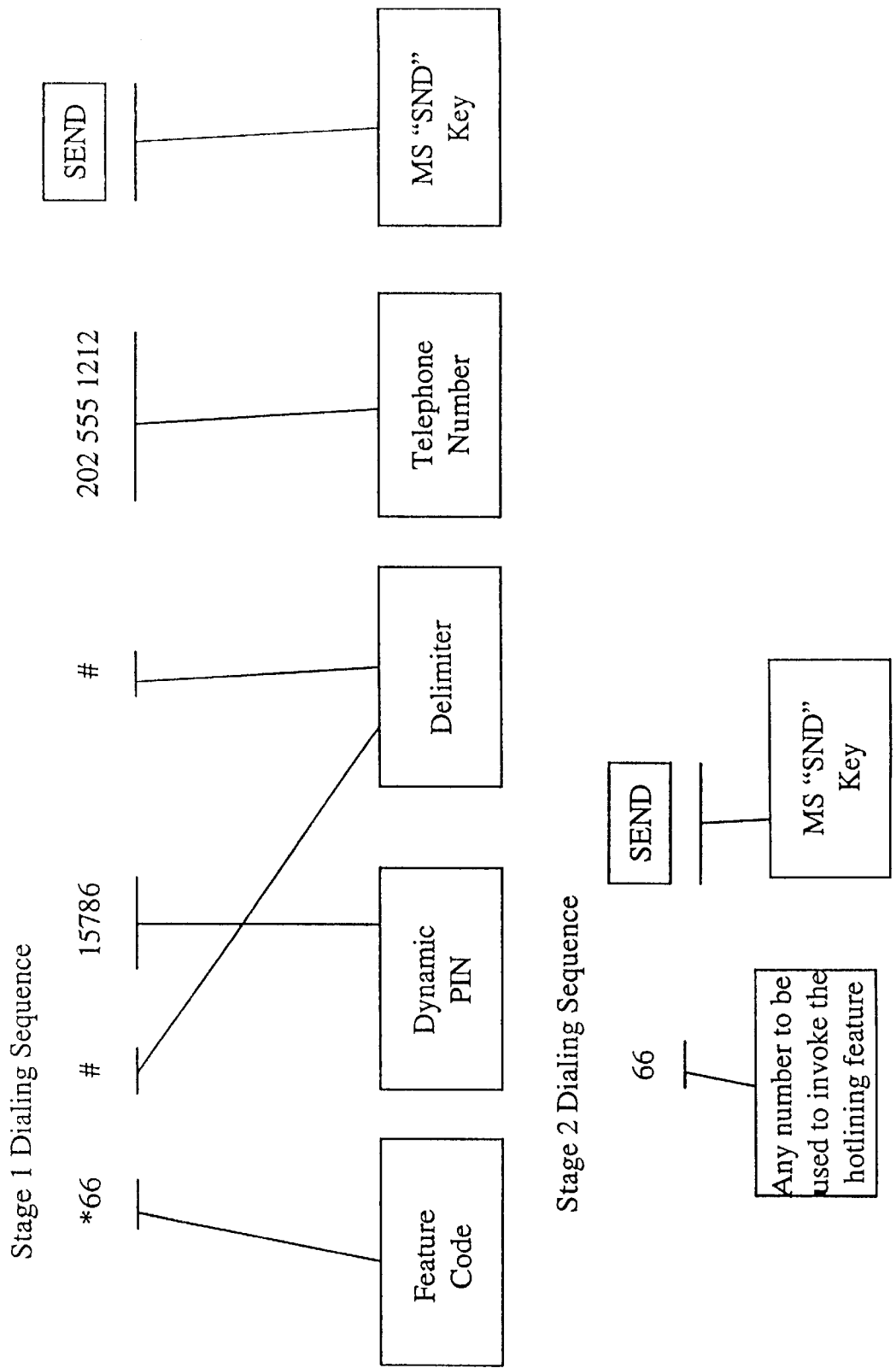
FIG. 15 is a view of a dissected sample first stage of dialing in the instant invention.

Note that the sequences shown above are exemplary only. FIG. 15 is provided to illustrate the components of a sample dialed string.

In illustrative explanation, a first stage of dialing contains, for example, an IS-41 standard feature code sequence, a dynamic pin of variable size that is read from the authentication token 150, a delimiter to indicate the end of the PIN and start of the dialed digits, and finally the "SND" button. A second stage of dialing is simply a number sequence of arbitrary length and/or composition and the "SND" key. The number sequence in the second stage is used as a means of invoking call delivery to the hotline number.

Optionally, by not entering the number sequence for the second stage, a user may opt out of using the hotlining feature. Alternatively, in another embodiment, the instant invention may automatically modify the user's profile as mentioned above. That is, this alternate embodiment may include hotlining the user to a desired telephone or destination number without the user having to enter the number sequence for a second stage.

The first stage of dialing contains two critical pieces of information that are bound together in a single message, effectively acting as a "digital signature" for the subscriber. These two data elements are the dynamic PIN and the telephone number or destination number. The dynamic PIN authenticates the subscriber at the random PIN authentication engine and/or authentication center. The telephone number or destination number restricts, in this "anti-hijacking" embodiment, authorized calls to this dialed number.

Figure 16:
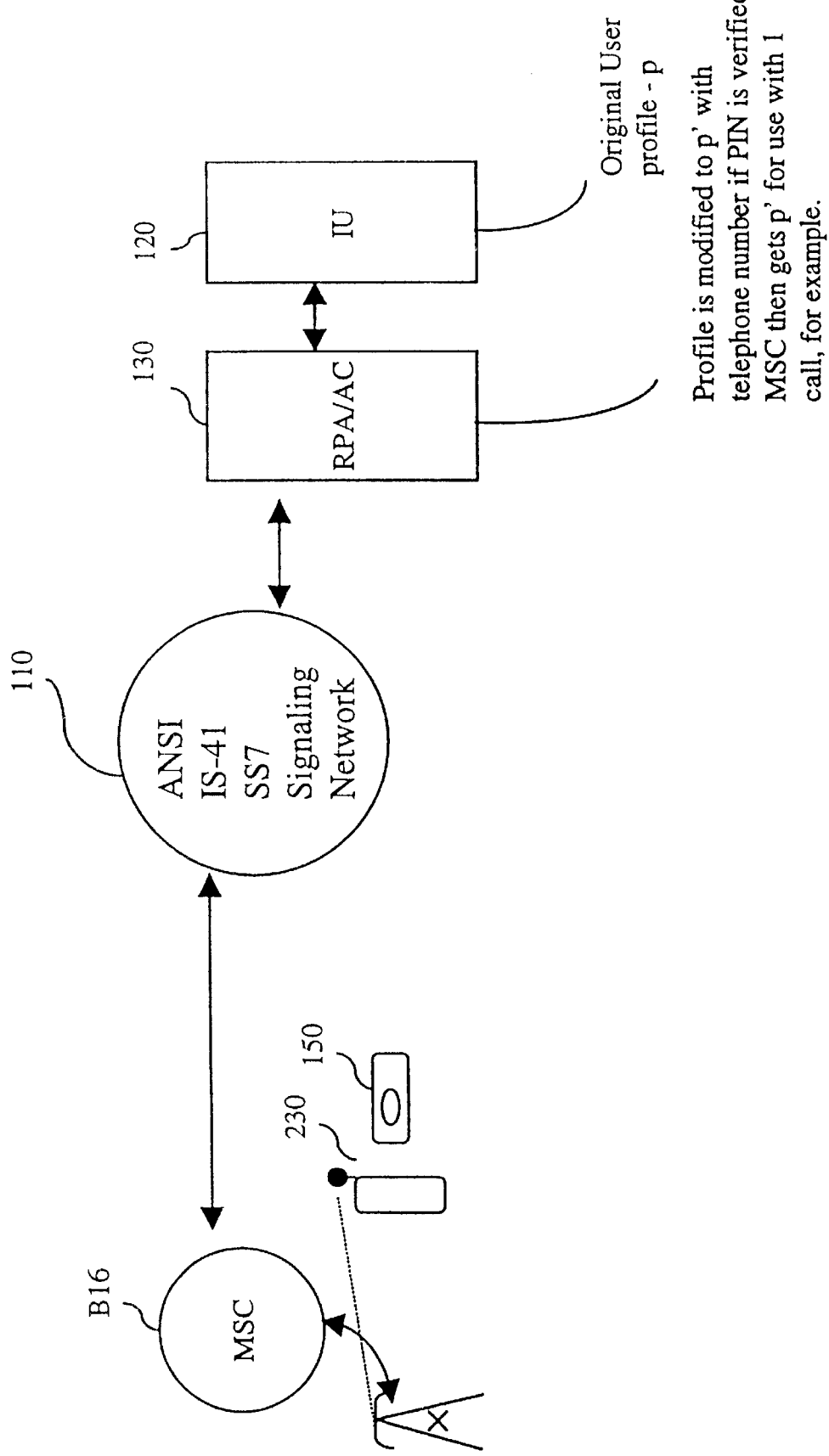
FIG. 16 is a schematic of another embodiment of the instant invention.

The elements of a system having hotlining capabilities as described above are shown in FIG. 16. The IU 120 is connected to the RPA/AC 130 which is in turn connected to the communications network 110. All switches or MSCs are connected to this network. Base stations or cell sites B16 are connected to the MSC. The mobile station 230, for example, a telephone, is connected to the base station B16 via an insecure radio path, as indicated by a dotted line in FIG. 16. The token 150 that generates the dynamic or random PIN is held by the user along with the mobile station 230.

The MSC passes the information from the first stage of dialing across the network to the RPA 130. The RPA 130 validates the PIN and requests the user profile from the IU 120. The RPA 130 gets the user profile and modifies it to restrict dialing only to the number from the dialed digit sequence. This is done by modifying the field for "hotline" number in accordance with a non-authenticating network specifications, such as a IS-41 Rev. A specification. The RPA 130 sends the profile to the mobile switching center, for example, with the "hotline" number set for the subscriber. The MSC will allow, for example, only one call. Naturally, the number of restricted calls may be more than one, for example, two, three, or more. In any event, regardless of the digits dialed next by the subscriber, the call is routed to the hotline number.

This method will eliminate fraudulent use of cellular service in non-authenticating markets, i.e., those markets in which the standardized "challenge-response" has not been deployed. "Cloners" will not be able to connect calls to destinations by beating the legitimate users to the second call as is possible in the prior art. That is, even a successful cloner would be hotlined to the subscriber-dialed telephone number.

The random PIN authentication engine may optionally include redundant power systems to ensure continuous operation for subscriber convenience. The data center optionally includes Uninterruptible Power Supplies (UPS), which may be implemented in multiple parallel modules, Battery Back-up systems, Automatic Transfer Switches (ATS) and/or power generator back-up, along with multiple electric circuit feeds. By way of illustration, an Uninterruptable Power Supply (UPS) is a device that provides a clean, reliable source of power to maintain systems in the event of power disturbances and/or interruptions. The UPS device may include a rectifier/charger, inverter and a battery system. The battery system may include one or more, for example, sealed lead-acid (SLA), Nickel-Cadmium (Ni—Cd) and/or Nickel-Metal Hydride (NiMH) batteries. For example, there may be five sets of back-up redundancy for the instant invention. Fewer or greater sets are acceptable depending on the need for fault tolerance.

To enhance fault tolerance, the authentication server and/or the communications server may each have a back-up server that mirrors it. That is, for example, if a primary authentication server fails, a secondary mirroring authentication server may immediately come on-line to prevent service disruption to subscribers.

One of ordinary skill in the art will recognize that the authentication engine may include, for example, a communications server and an authentication server may be configured in a distributed environment or in a centralized environment to accommodate site, resource, and/or usage requirements. Alternatively, the authentication engine may be embodied in a single server, namely a communications and authentication server. An advantage to separating the functions between two servers may include increased processing speed through task specialization. To this end, multiple processors may be included in the authentication server and/or the communications server to maintain or improve service throughput even with increased subscriber demand.

One of ordinary skill in the art will appreciate that the communications network of the instant invention may include any network requiring authentication. Thus, the scope of the invention also includes other wireless communications networks, such as Nordic Mobile Telephone network and Personal Digital Communications network.

The scope of the invention also includes, for example, wireline communication networks that may require user authentication for access to, for example, "calling card" service for local or long distance telephone service. Likewise, the scope includes wireline communication networks that may require user authentication for authorizing, for example, credit card and/or debit card transactions and/or account updates. It is to be understood that in either situation, an authentication engine according to the instant invention would be required to be operatively connected in a standard configuration to an access point or authorization point to validate user identities.

The communications network of the invention may further include, by way of illustration, one or more area computer networks that may require user authentication for access thereto, such as the Internet, and local and/or wide area networks that may or may not be connected to the Internet. Analogous to directory numbers for telephone networks, it is to be understood that area computer networks may have unique network addresses, for example, an Internet Protocol address or a Uniform Resource Locator. In such a communications network, a communications device according to the instant invention may include, for example, a computer operatively connected to a modem, which in turn is operatively connected to the communications network. The modem may be connected to the communications network via standard wireline connections. Alternatively, the modem may be connected to the network via, for example, standard cellular phone networks, such as cellular digital packet data-compatible networks.

In such a manner, on-line transactions on such area computer networks may in addition to, or alternatively, require user authentication for which the instant invention may be advantageously employed. Again, an authentication engine according to the instant invention may be operatively connected in a standard configuration to an access point or authorization point to validate user identities.

By way of illustration, the random PIN authentication engine may be operatively connected to an access gateway between a telephony network and the Internet. As a more specific example, a TCP/IP-based network may interconnect, for example, two remotely located IS-41-based wireless networks so as to transport, for example, non-time-critical, short messages between the two wireless networks. Of course, messages of any suitable length may also be used. These messages may, for example, be World Wide Web-based message entries. In this example, at least two access gateways are required, one for each TCP/IP network to IS-41 network interface. The authentication engine according to the instant invention may be operatively connected to either or both such access gateways.

For completeness of the example, it is to be understood that, by way of illustration, anyone with World Wide Web access may enter a mobile subscriber's telephone number and a text message at a World Wide Web site. After the user enters the message, it is sent over the TCP/IP network to the appropriate IS-41 network. The access gateway converts the message into an IS-41 message and sends it to the mobile switching center, which routes the message to the base station. From there, the message is transmitted to the mobile station where it is displayed. Certainly, the reverse process is also possible, whereby message entry into an appropriately configured mobile station may ultimately be sent to the World Wide Web site. In either direction, user authentication may be desirable, in which case, the instant invention may be advantageously employed as described.

It is also to be understood that the authentication token may be embodied in a number of different forms, including or aside from that described above. For example, the token may include a transmitter for transmitting one or more electromagnetic signals including the dynamic personal identification number to the communications device. The communications device may include a receiver for receiving the electromagnetic signal or signals therefrom.

To this end, the transmitter may include a photo-emitter, and the receiver may include a photo-detector. Alternatively, the authentication token may include, for example, a tone encoder or a loop disconnect (now, commonly referred to as "pulse") encoder operatively connected to the transmitter. The communications device may include a tone decoder or a pulse decoder, respectively, operatively connected to the receiver. By way of illustration, the tone encoder and tone decoder may exchange dual tone multi-frequency signals.

It is also to be understood that the authentication token may yield a personal identification number of any practicable number of digits. It has been determined that a five digit dynamic personal identification number sufficiently balances user friendliness and encryption strength. Nevertheless, fewer number of digits or greater number of digits may also be used.

Although typical cryptographic algorithms utilize numerical inputs and produce numerical outputs, the above-mentioned personal identification number according to the instant invention may include any character sequence. In this case, the cryptographic algorithm employed in the authentication token and in the authentication engine should support such a character sequence, and the communications device should also be suitably equipped to support such a character sequence. Naturally, an advantage of restricting the character sequence to numbers includes the world-wide applicability of any given authentication token.

The instant invention may be implemented using any standard transmission protocol. For example, code division multiple access (CDMA), wherein each signal has its own code and all signals are co-located in the same frequency band, may be used. As an other example, time division multiple access (TDMA), wherein each signal is sent at a fixed time slot in a series of time slots and is received in sequence then stored, extracted and reconstituted by a synchronized receiver, may be used. On the Internet, transmission protocols for use with the instant invention may include, for example, Transmission Control Protocol (TCP) and Internet Protocol (IP). TCP uses a set of rules to exchange messages with other Internet points at the information packet level. IP uses a set of rules to send and receive messages at the Internet address level.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for validating an identity of a subscriber in a communications network, comprising:
    at least one communication server including a database mapping valid communications device identification numbers to respective cryptographic keys, an input including a possible device identification number, and an output including a valid cryptographic key mapped thereto, if the possible device identification number is included in the database; and
    at least one authentication server including a first time-varying element for generating a time-varying value, and a processor, said authentication server receiving the valid cryptographic key from said communication server, said processor cryptographically processing the cryptographic key and the time-varying value to generate at least one acceptable, dynamic personal identification number, said processor comparing for identity the at least one acceptable generated personal identification number with a dynamic personal identification number to validate an identity of a subscriber, the dynamic personal identification number being generated independently of said communications server, said authentication server, and elements responsive to the communications network.

2. The system according to claim 1, further comprising:
    an interoperability unit translating communication signals between the communications network in which the subscriber is located and at least one other communications network, said interoperability unit communicating with at least one of said communication server and said authentication server.

3. The system according to claim 2, further comprising at least one protocol analyzer connecting at least one of the communication networks to said interoperability unit, said at least one protocol analyzer converting a data format of received communications messages into a data format readable by said interoperability unit and queuing the converted communications messages for said communications server.

4. The system according to claim 1, further comprising at least one password generator cryptographically processing at least two inputs thereto, the at least two inputs comprising a second time-varying element and at least one of the cryptographic keys to generate an output comprising the dynamic personal identification number.

5. The system according to claim 4, further comprising at least one communications device communicating with said communications network and with said communications server, said at least one communications device including at least one input element for receiving the dynamic personal identification number from said password generator.

6. The system according to claim 5, wherein said password generator includes a display for displaying the dynamic personal identification number, said communication device including a keypad.

7. The system according to claim 5, wherein said password generator includes a transmitter for transmitting at least one electromagnetic signal including the dynamic personal identification number to said communications device, said communications device including a receiver for receiving the at least one electromagnetic signal including the dynamic personal identification number from the password generator.

8. The system according to claim 7, wherein said transmitter includes a photo-emitter and said receiver includes a photo-detector.

9. The system according to claim 7, wherein said password generator includes one of a tone encoder and a pulse encoder operatively connected to said transmitter, said communications device including one of a tone decoder and a pulse decoder, respectively, operatively connected to said receiver.

10. A method of validating an identity of a subscriber in a communications network comprising:

a) transmitting a dynamic personal identification number, generated independently of an authentication engine and elements responsive to the communications network, from a communications device to the authentication engine remotely located thereto; and b) comparing for identity at least one acceptable personal identification number to the transmitted dynamic personal identification number for validating the identity of a subscriber at the authentication engine.

11. The method according to claim 10, further comprising the steps of:

providing the subscriber with access to the communications network, if identity of the at least one acceptable personal identification number and the transmitted dynamic personal identification number exists; and denying the subscriber with access to the communications network, if identity of the at least one acceptable personal identification number and the transmitted dynamic personal identification number does not exist.

12. The method according to claim 10, further comprising the steps of;

transmitting a device identification from the communications device to the authentication engine prior to said dynamic personal identification number transmitting step a);

generating the dynamic personal identification number by using a password generator, operatively independent of the authentication engine and the elements responsive to the communications network, to process a time-varying input, a cryptographic key input, and a cryptographic algorithm;

determining a cryptographic key corresponding to the transmitted device identification from a database in the authentication engine mapping valid device identifications to respective cryptographic keys; and cryptographically processing the determined cryptographic key and a time-varying value at the authentication engine to generate the at least one acceptable personal identification number.

13. The method according to claim 10, wherein said step a) of transmitting the dynamic personal identification number includes transmitting the dynamic personal identification number to the authentication engine via a mobile switching center in the communications network.

14. The method according to claim 10, wherein the authentication engine includes a communications server and an authentication server communicating therewith, the communications server, including the mapping database, receiving the device identification number, and performing said step of determining a cryptographic key corresponding to the received device identification number, the authentication server performing said comparing step b).

15. The method according to claim 14, further comprising the step of:

translating communication signals between the communications network in which the subscriber is located and at least one other communications network by using an interoperability unit communicating with at least one of said communication server and said authentication server.

16. The method according to claim 10, wherein the authentication engine includes a communications and authentication server, which includes the mapping database, the communications and authentication server receiving the device identification number, performing said step of determining a cryptographic key corresponding to the received device identification number, and performing said comparing step b).

17. A system for validating an identity of a subscriber in a communications network, comprising:

at least one communication server including a database mapping valid communications device identification numbers to respective cryptographic keys, an input including a possible device identification number, and an output including a valid cryptographic key mapped thereto, if the possible device identification number is included in the database;

at least one authentication server including a first time-varying element for generating a time-varying value, and a processor, said authentication server receiving the valid cryptographic key from said communication server, said processor cryptographically processing the cryptographic key and the time-varying value to generate at least one acceptable, dynamic personal identification number, said processor comparing for identity the at least one acceptable generated personal identification number with a dynamic personal identification number to validate an identity of a subscriber, the dynamic personal identification number being generated independently of said communications server, said authentication server, and elements responsive to the communications network; and an interoperability unit translating communication signals between the communications network in which the subscriber is located and at least one communications network, said interoperability unit communicating with at least one of said communication server and said authentication server, wherein, upon validating the identity of the subscriber, said authentication engine restricts the subscriber to a number of authorized calls to one of a subscriber-desired telephone number and a subscriber-desired communications network address.

18. The system according to claim 17, wherein said authentication engine obtains a profile of the subscriber upon validating the identity thereof, said authentication engine modifying the profile of the subscriber to restrict the subscriber to the number of authorized calls to the one of a subscriber-desired telephone number and a subscriber-desired communications network address, said authentication engine transmitting the modified profile to a mobile switching center serving the subscriber thereby instructing the mobile switching center to enable subscriber access to the one of a subscriber-desired telephone number and subscriber-desired communications network address for the restricted number of calls.

19. The system according to claim 17, further comprising at least one protocol analyzer connecting at least one of the communication networks to said interoperability unit, said at least one protocol analyzer converting a data format of received communications messages into a data format readable by said interoperability unit and queuing the converted communications messages for said communications server.

20. The system according to claim 17, further comprising at least one password generator cryptographically processing at least two inputs thereto, the at least two inputs comprising a second time-varying element and one of the cryptographic keys to generate an output comprising a personal identification number.

21. The system according to claim 20, further comprising at least one communications device communicating with said communications network and with said communications server, said at least one communications device including at least one input element for receiving the dynamic personal identification number from said password generator.

22. The system according to claim 21, wherein said password generator includes a display for displaying the dynamic personal identification number, said communication device including a keypad.

23. The system according to claim 21, wherein said password generator includes a transmitter for transmitting at least one electromagnetic signal including the dynamic personal identification number to said communications device, said communications device including a receiver for receiving the at least one electromagnetic signal including the dynamic personal identification number from the password generator.

24. The system according to claim 23, wherein said transmitter includes an photo-emitter and said receiver includes a photo-detector.

25. The system according to claim 23, wherein said password generator includes one of a tone encoder and a pulse encoder operatively connected to said transmitter, said communications device including one of a tone decoder and a pulse decoder, respectively, operatively connected to said receiver.

26. A method of validating an identity of a subscriber in a communications network comprising:

a) transmitting a dynamic personal identification number, generated independently of an authentication engine and elements responsive to the communications network, from a communications device to the authentication engine remotely located thereto;

b) comparing for identity at least one acceptable personal identification number to the transmitted dynamic personal identification number for validating the identity of a subscriber at the authentication engine and c) restricting the subscriber to a number of authorized calls to one of a subscriber-desired telephone number and a subscriber-desired communications network address.

27. The method according to claim 26, further comprising the steps of:

providing the subscriber with access to the communications network, if identity of the at least one acceptable personal identification number and the transmitted dynamic personal identification number exists; and denying the subscriber with access to the communications network, if identity of the at least one acceptable personal identification number and the transmitted dynamic personal identification number does not exist.

28. The method according to claim 26, further comprising the steps of;

transmitting a device identification from the communications device to the authentication engine prior to said dynamic personal identification number transmitting step a);

generating the dynamic personal identification number by using a password generator, operatively independent of the authentication engine and the elements responsive to the communications network, to process a time-varying input, a cryptographic key input, and a cryptographic algorithm;

determining a cryptographic key corresponding to the transmitted device identification from a database in the authentication engine mapping valid device identifications to respective cryptographic keys; and cryptographically processing the determined cryptographic key and a time-varying value at the authentication engine to generate the at least one acceptable personal identification number.

29. The method according to claim 26, wherein the authentication engine includes a communications server and an authentication server communicating therewith, the communications server, including the mapping database, receiving the device identification number, and performing said step of determining a cryptographic key corresponding to the received device identification number, the authentication server performing said comparing step b).

30. The method according to claim 29, further comprising the step of:

translating communication signals between the communications network in which the subscriber is located and at least one other communications network by using an interoperability unit communicating with at least one of said communication server and said authentication server.

31. The method according to claim 26, wherein said transmitting step includes transmitting the dynamic personal identification number via one of a time division multiple access transmission protocol and a code division multiple access transmission protocol.

* * * * *